(12) United States Patent
De Greef et al.

(10) Patent No.: US 9,746,663 B2
(45) Date of Patent: *Aug. 29, 2017

(54) ELECTROWETTING PIXEL WITH TWO ELECTROWETTING ELEMENTS

(71) Applicant: Amazon Technologies, Inc., Seattle, WA (US)

(72) Inventors: Petrus Maria De Greef, Waalre (NL); Gor Manukyan, Veldhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/788,663

(22) Filed: Jun. 30, 2015

(65) Prior Publication Data

US 2017/0003496 A1    Jan. 5, 2017

(51) Int. Cl.
*G02B 26/00* (2006.01)
*G02B 26/08* (2006.01)
*G02F 1/29* (2006.01)
*G02B 5/20* (2006.01)

(52) U.S. Cl.
CPC ............ *G02B 26/005* (2013.01); *G02B 5/201* (2013.01); *G02B 26/007* (2013.01)

(58) Field of Classification Search
None
See application file for complete search history.

(56) References Cited

U.S. PATENT DOCUMENTS

| | | | |
|---|---|---|---|
| 9,423,607 B1* | 8/2016 | De Greef | G02B 26/005 |
| 2013/0050807 A1 | 2/2013 | Lee et al. | |
| 2013/0208331 A1 | 8/2013 | Kim et al. | |
| 2013/0242367 A1 | 9/2013 | Cho et al. | |
| 2014/0168278 A1 | 6/2014 | Shi et al. | |
| 2014/0293396 A1 | 10/2014 | Leguijt et al. | |
| 2016/0238915 A1* | 8/2016 | Kim | G02F 1/136213 |

OTHER PUBLICATIONS

Klompenhouwer et al.; "Subpixel Image Scaling for Color Matrix Displays"; Philips Research Laboratories, prof. Holstlaan 4 (WO-02) 5656 AA Eindhoven, the Netherlands (2003).
International Search Report for PCT Application No. PCT/EP2015/065294 dated Sep. 28, 2016.

* cited by examiner

*Primary Examiner* — Brandi Thomas
(74) *Attorney, Agent, or Firm* — EIP US LLP

(57) ABSTRACT

An electrowetting pixel, comprising a first electrowetting element with a first subpixel and a second subpixel, and a second electrowetting element adjoining the first electrowetting element and with a third subpixel and a fourth subpixel.

24 Claims, 23 Drawing Sheets

US 9,746,663 B2

ELECTROWETTING PIXEL WITH TWO ELECTROWETTING ELEMENTS

BACKGROUND

In known electrowetting display devices the color gamut for images displayed by the device may be controlled by designing pixel color filters with appropriate hue and saturation parameters for example. However, such images can have a limited luminance and spatial resolution.

It is desirable to improve at least one of luminance and spatial resolution of display effects provided by an electrowetting display device.

DETAILED DESCRIPTION

Figure 1:
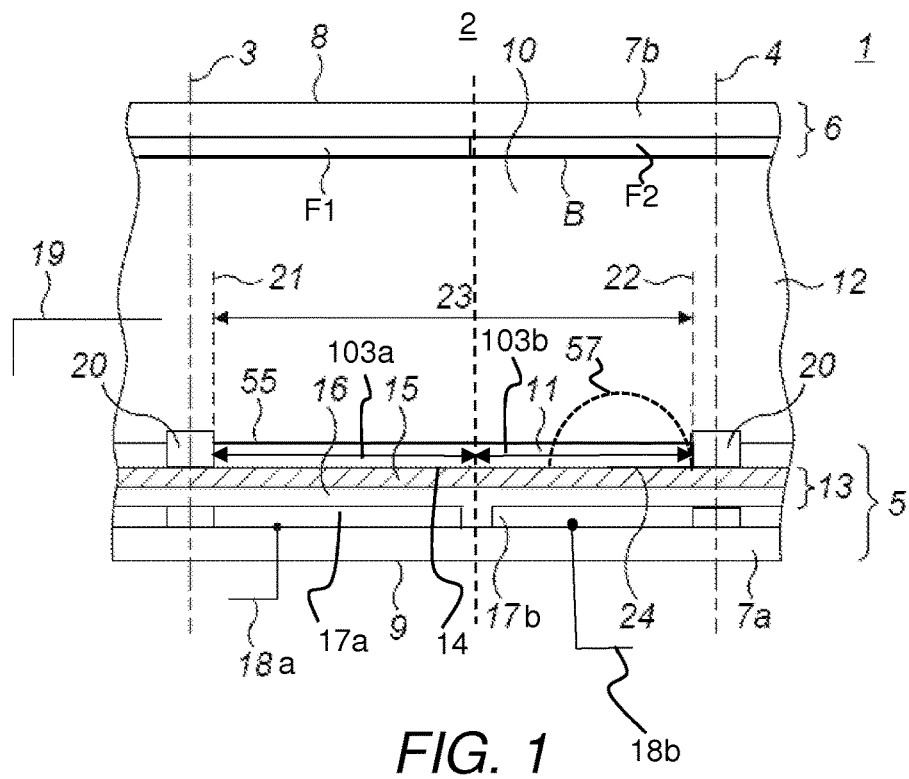
FIG. 1 shows a cross section of an example electrowetting element.

FIG. 1 shows a diagrammatic cross-section of part of an example electrowetting device. In this example the device is an electrowetting display device 1 including a plurality of electrowetting elements, which are also referred to as electrowetting display elements 2, and may otherwise be referred to as picture elements or electrowetting elements or cells, one of which is shown in the Figure. In examples described herein, a pixel may comprise one or more than one electrowetting element. Typically, a pixel may be considered a spatial unit for displaying an image, for example each pixel provides a display effect which together with the display effect of each other pixel generates an image for a viewer. A pixel may typically be formed for example of a plurality of sub-pixels. A sub-pixel is, for example, a component of a pixel for contributing to the display effect of a pixel. For example, a sub-pixel may correspond with one hue for contributing to a display effect of the pixel. For example, a pixel may comprise a red (R) subpixel, a (G) green subpixel and a blue subpixel (B) which respectively are configured to for example output red light, green light and blue light. By adjusting the amount of red, green and blue light contributed by each subpixel for a given display effect of the pixel, a color of the display effect of the pixel may be controlled. A pixel comprising an R, G and B subpixel may be considered a full color pixel or an RGB pixel. It is to be understood that in some examples a single electrowetting element may comprise more than one subpixel, whereas in other examples each electrowetting element may be a subpixel. A subpixel often, but not necessarily, in examples corresponds with a color or hue for display, to contribute to a display effect. Therefore, a subpixel may comprise or be associated with a color filter of the appropriate hue. For example, a color filter may overlap or substantially overlap an underlying surface which the first fluid is configurable to cover or uncover. For example, the underlying surface covered or overlapped by a color filter may be considered to be a display area or a subpixel area. Therefore, in examples below, a subpixel area may be referred to with for example an overlapping color filter. It is to be appreciated that each subpixel area is for example part of a different subpixel. For example, a first subpixel may comprise a first subpixel area and a second subpixel may comprise a second subpixel area. In examples to be described, the electrowetting elements may include a variety of different subpixel configurations. Example electrowetting elements described herein include a variety of plan-view configurations with for example walls delimiting a lateral extent of each electrowetting element, which may further be included in a variety of matrix configurations, examples of which are provided.

Figure 2:
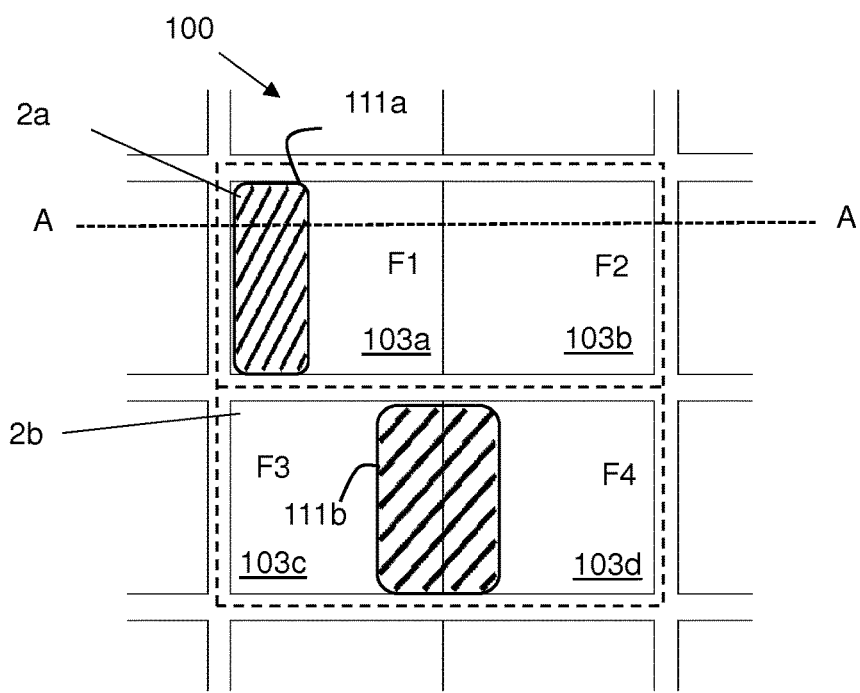
FIG. 2 is a plan view showing an example electrowetting pixel with an example fluid configuration.

FIG. 1 depicts a cross section of part of an example electrowetting element 2. FIG. 2 depicts an example electrowetting pixel 100 in plan view, including a first display element 2a and a second display element 2b. First and second display elements 2a and 2b are each an example of a display element 2, and may each incorporate all of the features of the other display elements. FIG. 1 represents an example cross section A-A of the first display element 2a.

As may be seen in FIG. 1, the lateral dimension of the display element 2 is indicated by two dashed lines 3, 4. The display elements comprise a first support plate 5 and a second support plate 6. The support plates may be separate parts of each display element 2, or the support plates may be shared in common by the plurality of display elements. The support plates may include a glass or polymer substrate 7a, 7b and may be rigid or flexible. The support plates in some examples include further layers and/or structures other than those illustrated, for example circuitry for controlling the display elements. Such features are not depicted for clarity.

The display device has a viewing side 8 on which an image or display formed by the display device can be viewed and a rear side 9. In FIG. 1 a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective, transmissive or transflective type. The display device may be an active matrix driven display device. The plurality of display elements may be monochrome. For a color display device the display elements may be divided in groups, each group having a different color; alternatively, an individual display element may be able to provide more than one color display effect.

Display element 2 includes a first subpixel area 103a and second subpixel area 103b of the surface of the support plate, as indicated by arrows. A subpixel area is an area over which a subpixel display effect may be provided, for example an area which may overlap an electrode and which is contactable by a fluid to a greater or lesser extent in dependence on an applied voltage. Typically, an area is a two-dimensional area or surface for example. For example, pixel 100 of FIG. 2 includes four subpixel areas. The first electrowetting element 2a includes first subpixel area 103a and second subpixel area 103b, and the second electrowetting element 2b includes third subpixel area 103c and fourth subpixel area 103d. While the example display elements 2, 2a, and 2b each include two respective subpixel areas, this is not intended to be limiting. In further examples, some of which are provided below, there may be one subpixel area, three subpixel areas, or more than three subpixel areas in a single display element.

FIG. 1 depicts a first color filter F1, which substantially overlaps the first subpixel area 103a, and a second color filter F2, which substantially overlaps a second subpixel area 103b. By substantially overlapping it is typically the case that a majority of, for example nearly all, for example 90% or greater, or all of the surface area, in a plane parallel the subpixel area, of each filter is overlapping at least a portion of the surface areas of a respective subpixel area 103a or 103b in a plan view. For example, 90% or greater of first color filter F1 and second color filter F2 may be overlapping first subpixel area 103a and second subpixel area 103b, respectively. This is not intended to be limiting, however, as other configurations of color filters are contemplated. In examples, a filter and a subpixel area may completely overlap or a filter may be formed to cover a very small area compared to the subpixel area.

A color filter is typically one or more layers of a material which are configured to filter light incident on the filter. Indeed, it may be a combination of layers show in cross-section of an electrowetting element which together filter out light of one or many wavelengths and provide an output color effect. For example, the colour filter removes or filters out a portion of light entering the color filter. The light that is filtered out is for example of one or a band of many wavelengths and/or colors of light. So, a color filter generally has a degree of transparency to permit light not removed by the color filter to be transmitted through the color filter. The filtering property of a color filter depends for example on a material the color filter is formed of or comprises.

The first color filter F1 and the second color filter F2 may be used separately to create a first color effect and a second color effect respectively for first and second subpixels. A color effect may include a hue and luminance. A hue, or a color or shade, is dependent on a dominant wavelength of light independent of intensity or lightness. For example, hues may include red, green, blue, yellow, magenta, cyan, and any other color. For example, color filters may be used to generate primary colors, or the color effect corresponding to a single subpixel area. For example, color filter F1 or F2 may each be used to provide one of a red, green, or blue hue respectively. Alternatively, color filters F1 and F2 may be used to generate a secondary color, or a color effect corresponding with a combination of at least two subpixel areas that each correspond with a different color effect. For example, color filters F1 and F2 may be used to provide a combined display element 2 color effect, for example if color filter F1 provides a first color effect of a green hue and filter F2 provides a second color effect of a blue hue, the combined display element color effect provided may be a cyan hue. In further examples, first color filter F1 and second color filter F2 may be used within a pixel 100 to contribute to provide a pixel 100 color effect. In further examples, however, a color filter in a first electrowetting element may be combined with a color filter in an adjacent electrowetting element to create a combined two electrowetting element color effect, as will be further described below.

Subpixel areas within display elements or pixels may further correspond with color effects through luminance. Luminance is typically a photometric measure of the luminous intensity per unit area of light travelling in a given direction for example. Luminance quantifies the amount of light that passes through, is emitted from or is reflected from a particular area, and falls within a given solid angle. Luminance is measured in candelas per square meters. When used within an electrowetting display element or a display unit, first color filter F1 and second color filter F2 may further be used to provide a plurality of display element or pixel luminance values. In an example, a display element with a display effect of a purple hue may have a relatively high or a relatively low luminance, as determined by a configuration of a first fluid and a second fluid in contact with at least part of a display area, as will be described below.

In examples, a subpixel area may correspond with a white filter. A white filter may be considered a color filter. White light comprises a greater or wider band of wavelengths than other color hues. Therefore a white filter, which may be formed of one or many layers, permits more incident light of more wavelengths to be transmitted through the white filter than for other hue filters. An output of a white filter is white or substantially white within acceptable variations, for example. In examples, a white filter may include light passing through a subpixel area through viewing side 8 of a display element or a pixel that is substantially the same as the light entering the display element or display unit. For example, a reflective or transreflective element may receive incident "white" light that includes a broad continuum of wavelengths or a spectrum of red, green, and blue. A subpixel area together with a white filter may transmit reflected light with little absorption or change or with more light than a non-white color filter from the incident light. In further examples, a white filter may be that the light passing through a subpixel area and through viewing side 8 includes a broad continuum of visible light, or that the relative difference between the wavelengths emitted do not provide a distinctive hue detectable to the human eye. In other words, the light emitted may be on a greyscale between white and black, as perceived by the human eye.

A white filter is in examples at least one layer of the electrowetting element through which light passes without being filtered or which is less filtered than for a non-white color effect. For example, for an entire path of a light ray incident on the viewing or rear side of the electrowetting element, and passing through and being emitted from the electrowetting element, such a light ray may have incurred no more filtering than inherent or background absorption of structural components of the electrowetting element such as a layer in between color filter layers of the electrowetting element. Therefore, whilst in some examples a color filter for effectuating a color effect may be a single color filter layer, in other examples a color filter may include more than one different part of the electrowetting element through which a light ray passes and which effectuate some color or white. Such a white filter may for example be a transparent filter which transmits light with minimal or background light absorption, for example by transmitting substantially all light in the visible spectrum, for example transmission of 90%, 95% or greater of incident light. The white filter may transmit three times greater, or more, light than the color filter for effectuating a color effect. Hence, depending on the backlight wavelength composition, or a wavelength composition of incident light which is reflected within the electrowetting element, the filter may be considered to effectuate a white effect. White may in some cases be considered a color, however, from a filtering point of view, white is light which for example has been minimally filtered or has incurred background absorption rather than filtering by a color filter to filter out a predetermined wavelength or wavelength band. The extent of such filtering depends on the specific construction and choice of materials (and their light absorption properties) of the subpixel.

In examples where subpixel areas correspond with color effects, the color filters F1 and F2 may be non-switchable color filters; in other words, the color filters may have a fixed shape and therefore a spatial configuration of the non-switchable color filters is not changeable, for example is not switchable. Thus, the non-switchable color filters may be non-fluid color filters. This may be contrasted with for example the first fluid described below, which may include a dye or pigment therefore to act as a color filter which is switchable between different first fluid configurations. As explained below, the color filters further contribute to a display effect provided by the electrowetting element, in addition to a configuration of the first and second fluids. In the example of FIG. 1 there is a filter layer, in other words a layer including color filters F1 and F2, and in this example is lying on a surface of the second support plate 7b, which surface is a surface of the second support plate nearest to the space described below. It is to be appreciated in further examples that the filter layer may be located in a different position in the electrowetting element, for example on a surface of the second support plate furthest away from the space or as part of the first support plate, provided the filter layer is located such that light passing through the element to provide a display effect passes through the color filter layer. Alternatively, in other examples, the filter layer may be located in the first support plate; where the display element operates in a reflective manner, the filter layer is located between a reflector (such as a reflective electrode) and the surface adjoined by at least one of the first or second fluids. While the example of FIG. 1 includes two filters for two display areas, this is not intended to be limiting. Those of skill in the art will readily understand that display element 2 may include a single filter, or any number of filters greater than two.

A color filter, for example a color filter layer in examples has at least one part formed of a material functionable as the color filter. The at least one part comprises the first or second color filters F1 and F2. The color filters absorb at least one wavelength of light, for example in the visible spectrum, thus filtering the light passing through the color filters. The color filters may be formed of materials having a color filtering property.

The white filter may, for example, be formed of a suitable material or may be an opening, in other words an aperture or a hole or a space, for example in a color filter layer, through which light may pass. Examples of a material for forming the color filter include a resist material such as the JSR OPTMER™ CR series. These are pigment dispersed photo-resists. Where the white filter is formed of a material, an example material for forming the second region is selected from the JSR OPTMER SS series. These are heat-curable materials which can be used as protective overcoatings. They are mainly composed of acrylic polymers. The skilled person would readily understand how to form such a layer.

The term substantially used here is for example a degree of tolerance in the amount of light transmitted. A transmissive region may not therefore transmit all light but may transmit enough light such that a performance of the electrowetting element is not impeded. For example, 90%, 95% or greater of light may be transmitted by a white filter. The white filter may for example transmit three times greater, or more, light than a color filter. The white filter may for example be formed of a suitable material or may be an opening, in other words an aperture or a hole or a space, in the color filter layer, through which light may pass. Examples of a material for forming the color filter include a resist material such as the JSR OPTMER™ CR series. These are pigment dispersed photo-resists. Where the white filter is formed of a material, an example material for forming the white filter is selected from the JSR OPTMER SS series. These are heat-curable materials which can be used as protective overcoatings for a color filter region, but which can also be used to form the white filter. They are mainly composed of acrylic polymers. The skilled person would readily understand how to form such a color filter layer with patterned first and second regions.

The color effect or white filter corresponding to a subpixel area is not only dependent on the qualities of the respective color filter overlapping the subpixel area; the color effect is also dependent on the arrangement of a first and a second fluid in an electrowetting element. For example, FIG. 1 depicts a space 10, which may otherwise be considered to be a chamber, of each subpixel between the support plates and which is filled with two fluids, which in this example are liquids. In the example of FIG. 1, the space 10 is filled with a first fluid 11 and a second fluid 12 which, in the absence of an applied voltage, each form a layer.

The second fluid is for example electrically conductive or polar and may be water or a salt solution such as a solution of potassium chloride in water. The second fluid may be transparent, but may instead be colored, white, absorbing or reflecting. Electrically conductive typically is a second fluid capable of conducting electricity for example; for example an electrical current may flow through the second fluid due to the flow of ions through the second fluid. Polar typically is in examples that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bonds in the molecule, with for example one of the atoms being a heteroatom such as oxygen or nitrogen. For example, such a polar atom to atom bond is a bond between an oxygen (O) atom and a hydrogen (H) atom, i.e. an —O—H bond.

The first fluid is for example electrically non-conductive and may for instance be an alkane like decane or hexadecane or may be an oil such as silicone oil.

The second fluid is immiscible with the first fluid. Therefore, the first fluid and the second fluid do not substantially mix with each other and in some examples do not mix with each other to any degree. The substantial immiscibility of the first and second fluids is due to the properties of the first and second fluids, for example their chemical compositions;

the first and second fluids tend to remain separated from each other, therefore tending not to mix together to form a homogeneous mixture of the first and second fluids. Due to this immiscibility, the first and second fluids at least partially meet, for example contact, each other at an interface labelled 55 in FIG. 1 for when no voltage is applied and labelled 57 for when a voltage is applied, which interface defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The first fluid absorbs at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorbing for substantially all parts of the optical spectrum, or reflecting. A reflective first fluid may reflect the entire visible spectrum, making the layer appear white, or part of it, making it have a color. In examples to be described below, the first fluid is black and therefore absorbs substantially all parts of the optical spectrum, for example in the visible light spectrum. Substantially absorbs includes for example a degree of variation; therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid.

The support plate of each display element includes one or more electrodes. For example, display element 2 includes a first electrode 17a and a second electrode 17b. Each respective electrode overlaps the surface of the support plate corresponding to the display area. In FIG. 1, it may be seen that first subpixel area 103a overlaps and therefore corresponds with an electrode 17a and second subpixel area 103b overlaps and therefore corresponds with a second electrode 17b. This is not intended to be limiting, however. In examples, a display element may include any number of electrodes associated with any number of subpixel areas, examples of which are further provided herein. In the example display element 2, each electrode 17a and 17b substantially overlaps a respective subpixel area 103a and 103b. By substantially overlapping, it is typically that nearly all of the surface area of each electrode is overlapping at least a portion of a surface area of a respective subpixel area 103a or 103b in a plan view. For example, 90% of first electrode 17a and second electrode 17b may be overlapping first subpixel area 103a and second subpixel area 103b, respectively. This is not intended to be limiting, however, as other configurations of electrodes are contemplated. In examples, an electrode and a subpixel area may completely overlap or an electrode may be formed to cover a very small area compared to the subpixel area.

The first and second electrodes 17a and 17b are separated from the fluids by the insulating layer 13. Electrodes of neighbouring display elements are separated by a non-conducting layer. In the example of display element 2, a small gap between electrodes 17a and 17b may be filled with non-conducting material to avoid a short between the first and second electrodes 17a and 17b. For a display element having a reflective operation, rather than transmissive, the electrode in some examples is reflective.

In examples, the insulating layer 13 of display element 2 may be transparent or reflective. The insulating layer 13 may extend between walls of a display element. To avoid short circuits between the second fluid 12 and any electrodes arranged under the insulating layer, layers of the insulating layer may extend uninterrupted over a plurality of display elements 2, as shown in FIG. 1. The insulating layer has a surface 14 facing the space 10 of the display element 2. In examples the surface 14 may be hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon®AF1600. The bather layer 16 may have a thickness, taken in a direction perpendicular the plane of the substrate, between 50 nanometers and 500 nanometers and may be made of an inorganic material like silicon oxide or silicon.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

In some examples, further layers may be arranged between the insulating layer 13 and the electrodes 17a and 17b. The electrodes 17a and 17b may be of any desired shape or form. The electrodes 17a and 17b of a display element are supplied with voltage signals by signal lines 18a and 18b, schematically indicated in the Figure. A second signal line 19 is connected to an additional electrode that is in contact with the conductive second fluid 12. The additional electrode may be common to all elements, when they are fluidly interconnected by and share the second fluid, uninterrupted by walls. The display element 2 may be controlled by one or more voltages V applied between the signal lines 18a, 18b, and 19. The electrodes 17a and 17b may be coupled to an electrowetting display apparatus. In an electrowetting display apparatus having the display elements or display units arranged in a matrix format, the electrodes may be coupled to a matrix of control lines on the substrate 7a.

A display effect provided by the display element may depend on the size of the first and second subpixel areas 103a and 103b and the extent the first fluid adjoins the surface, in dependence on the magnitude of the applied voltages V described above. The magnitude of the applied voltages V therefore may determine the configuration of the first and second fluids within the electrowetting element and may be used to control the fluid configuration. When switching the electrowetting element from one fluid configuration to a different fluid configuration, the size of the area where the second fluid adjoins the first and second display areas 103a and 103b may increase or decrease, with the area that first fluid adjoins first and second display areas 103a and 103b decreasing or increasing, respectively.

In the example of FIG. 1, the dimension of the display element 2, indicated by the dashed lines 3 and 4, corresponds with the centre of the walls 20. A display region 23 is a space between the inner side of the walls 20, indicated by the dashed lines 21 and 22 in FIG. 1. In the example of display element 2, display region 23 includes the first and second subpixel areas 103a and 103b, however in further examples display region 23 may include a single subpixel area or any number of subpixel areas. In examples described herein, with a display region of an electrowetting element comprising a number of subpixel areas, it is to be understood that in many examples the display region comprises only the areas described as part of that display region, which areas may for example be subpixel areas or white filters. For example, the sum of the area of each individual display area equals the area of the display region bounded for example by the walls.

In examples to be described, electrowetting display element 2 may include a variety of configurations of walls configured to confine or retain first fluid 11. As will be discussed below, in examples a display region may have a variety of shapes defined for example by walls, including square, rectangular, triangular, or hexagonal, in addition to others. When the display elements are arranged into an array or matrix layout, different display element shapes formed by walls may provide for different arrangements of display elements in the arrays or matrices. In such examples it is envisaged that the plan view shape of the display element defined by the wall, in combination with a combination of one or more color filters or subpixel areas or white filter, may be used to control properties such as hue, luminance, and saturation of a display element. In examples, the walls may extend from the first to the second support plate, or the walls may extend only partly from the first support plate to the second support plate as shown in FIG. 1.

Although the walls are shown as structures protruding from the insulating layer 13, in examples the walls may instead be formed by a surface layer of the support plate that acts as a boundary to retain fluid 11 by repelling the first fluid. For example, walls 20 may be formed of a surface layer with substantially different wettability than a portion of either first or second subpixel areas 103a and 103b. For example, the walls may include a hydrophilic or less hydrophobic layer. In further examples, walls 20 may include any combination of materials, including materials that extend away from the first support plate and surface layers with a substantially different wettability than a portion of the display region 23.

In the display element 2 depicted in FIG. 1, a first fluid 11 is configurable to adjoin at least a first part of at least one of the first subpixel area 103a or the second subpixel area 103b, in dependence on at least a first voltage applied using at least one of the first electrode 17a or the second electrode 17b. In other words, for example, by applying voltages to electrodes 17a and 17b, it is possible to change the coverage of the first fluid over subpixel area 103a and/or subpixel area 103b.

For example, FIG. 2 provides a plan view of display unit 100 including the first display element 2a and the second display element 2b. The second display element 2b is similar to the first display element 2a, and includes a third subpixel area 103c, a third filter, a third electrode, a fourth subpixel area, a fourth filter, a fourth electrode, and a third and fourth fluid which are similar respectively to the first subpixel area, the first filter, the first electrode and the second subpixel area, the second filter, the second electrode, and the first and second fluids, respectively. The first electrowetting display element 2a is adjacent to second display element 2b, with the first and third subpixel areas 103a and 103c adjacent and the second and fourth subpixel areas 103b and 103d adjacent.

In examples, pixel 100 may include a wall positioned between the first surface region and the second surface region. In further examples, the display unit 100 may include a first wall positioned around the first surface region and a second wall positioned around the second surface region. In examples a first wall on the surface of the support plate is positioned between the first subpixel area and the third subpixel area, and positioned between the second subpixel area and the fourth subpixel area. In further examples a second wall on the surface of the support plate is positioned between the fifth subpixel area and the seventh subpixel area, and positioned between the sixth subpixel area and the eighth subpixel area.

A first fluid 111a may be configured to adjoin at least a first part of at least one of the first or second subpixel areas 103a or 103b, in dependence on at least a first voltage applied using at least one of a first electrode or a second electrode. A third fluid 111b may also be configured to adjoin at least a second part of at least one of the third or fourth subpixel areas 103c or 103d, in dependence on at least a second voltage applied using at least one of a third electrode or a fourth electrode. The electrowetting display element 2a further includes a second fluid immiscible with the first and electrowetting display element 2b further includes a fourth fluid immiscible with the third fluid. In further examples, the second and fourth fluids may be part of a common reservoir, however, as described above.

FIG. 2 depicts the first fluid 111a configured to cover an outer half of subpixel area 103a and third fluid 111b configured to cover a center portion of second display element 2b that includes a portion of each of the third subpixel area 103c and the fourth subpixel area 103d. The example provided is not intended to be limiting, however. In examples, first and third fluids 111a and 111b may be configured to cover all or part of first, second, third, and fourth subpixel areas 103a, 103b, 103c, and 103d. When a subpixel area is exposed, for example at least partly uncovered by the first fluid, it is possible to reflect or transmit incident light through a respective subpixel area and filter to provide a color or white filter. The first, second, and third color effects are different for example.

The relative color effects and white filters provided by different of the first, second, third, and fourth electrowetting elements may determine a combined pixel hue and luminance. The respective contributions to pixel color or white filters provided by color filters corresponding with the first, second, third, and fourth subpixel areas may be determined by the amount of coverage due to the first or third fluid over each respective subpixel area and the respective luminance provided by the respective first, second, third, or fourth filter. For example, a filter providing a red hue color effect tends to emit less radiant flux than a filter providing a green hue color effect. The green filter may be said to be brighter than the red filter. Similarly, the white filter, which may remove almost or substantially no light for example, may be brighter than a green hue filter. Therefore, exposing one subpixel area by a predetermined amount may provide a different contribution to the total luminance and hue, which is related to the relative luminance of each subpixel area, than exposing a second subpixel area to the predetermined amount.

For example, if the first subpixel area corresponds with a first color effect and a second subpixel area corresponds with a second effect that is a red hue and a blue hue respectively, the first display element 2a will be capable of providing a display element color effect that includes the primary hues red and blue, the secondary hue purple, or no color effect at all. In the example, if the third subpixel area corresponds with a third color effect and a fourth subpixel area provides a fourth effect are a green hue and a white filter, respectively, the second display element 2b will be capable of providing a display element color effect that includes the primary color green with a plurality of luminance values. When the first display element and the second display element in the example configuration are used in combination as a pixel, it is possible to provide further color effects that include yellow and cyan.

In examples, the first and third fluids may be used to effectuate a pixel color effect comprising a plurality of combined electrowetting element luminance values for a predetermined pixel hue. In known devices, providing bright, saturated yellow hues, which are typically created using a combination of red and green, has presented challenges because it has been difficult to completely expose the red and green display areas to provide those color effects. In the example provided where the first display element 2a includes red and blue filters and the second display element 2b includes green and white filters, however, it is possible to move the first fluid 111a and the third fluid 111b completely off the subpixel areas corresponding to red, green color effects onto the subpixel areas corresponding to the blue and the white filter.

Therefore, in examples, the first fluid is configurable to adjoin substantially one of the first subpixel area or the second subpixel area without adjoining the second subpixel area or the first subpixel area, respectively. In further or alternative examples, the third fluid is configurable to adjoin substantially one of the third subpixel area or the fourth subpixel area without adjoining the fourth subpixel area or the third subpixel area, respectively.

In examples, the electrowetting pixel may provide a combined pixel luminance of the plurality of combined electrowetting element luminance that is greater than a maximum of a first subpixel luminance, a second subpixel luminance, and a third subpixel luminance. For example to improve luminance of yellow, it is further possible to expose the subpixel areas corresponding to the red hue and the green hue filter, and at least a portion of the subpixel area corresponding to the white filter. In this way, it may be possible to provide a plurality of electrowetting element luminance for a predetermined pixel hue.

In examples at least one of the first color filter or the second color filter may extend to a first edge of the first electrowetting element coincident for example with a lateral extent of the electrowetting element, and at least one of the third color filter or the fourth color filter may extend to a first edge of the second electrowetting element. This may provide the capability of controlling the saturation level of a color effect hue using the subpixel area that corresponds with the white filter, which is different from known devices.

Figure 3:
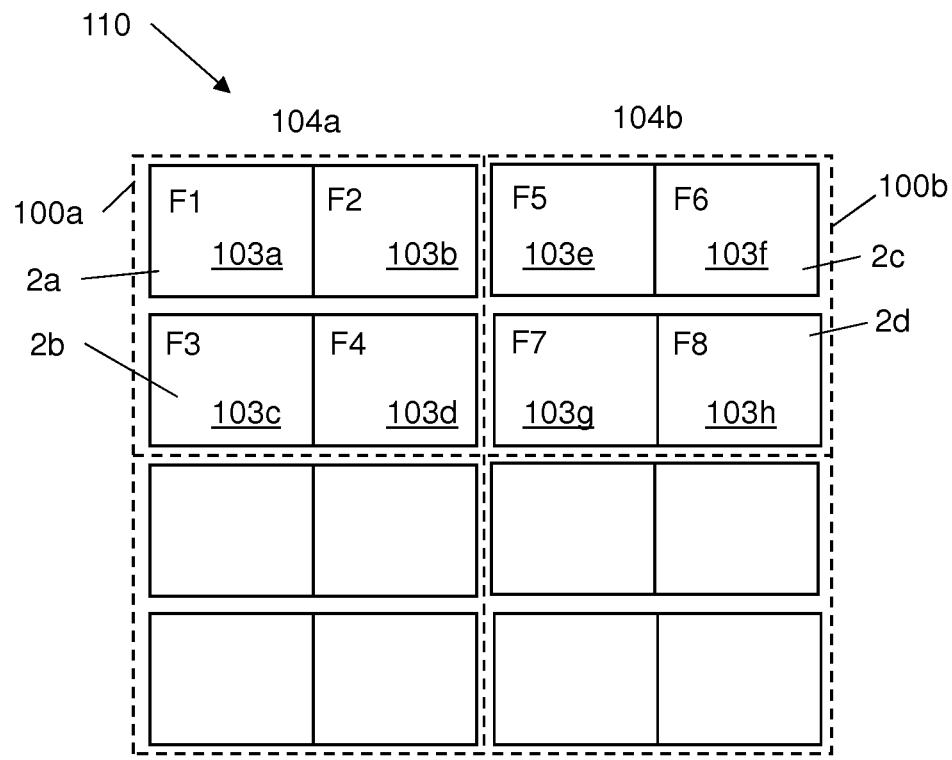
FIGS. 3 and 4 are plan views of example electrowetting display unit arrays.

In examples, an array of electrowetting pixels 100 may be provided. FIG. 3 depicts example array 110. Array 110 includes a first pixel 100a, and a second pixel 100b, both of which are similar to pixel 100 and incorporate similar features, however pixel 100b will be referred to using different reference numerals as explained herein but corresponding descriptions should be taken to apply where appropriate. The second pixel 100b includes a third display element 2c positioned adjacent to a fourth display element 2d. The second display element 2c includes a fifth subpixel area 103e adjacent to a sixth subpixel area 103f, and the fourth display element 2d includes a seventh subpixel area 103g and an eighth subpixel area 103h adjacent to the seventh subpixel area 103g and the sixth subpixel area 103f. Each of the fifth, sixth, seventh, and eighth subpixel areas corresponds with a respective and substantially overlapping color filter F5, F6, F7, and F8 and electrode (not pictured) and may correspond with a respective color or white filter. Third display element 2c further includes a fifth and sixth fluid which for example are similar to the first and second fluids respectively described earlier.

In the example of FIG. 3, the first electrowetting pixel is in a first array column 104a and the second electrowetting pixel is in a second array column 104b adjacent to the first array column 104a. The fourth subpixel area 103d is adjacent to the seventh subpixel area 103g. Array 110 may provide an aligned, ordered display upon which images may be depicted, including the color effect combinations of hue and luminance described above with regards to display unit 100.

Figure 4:
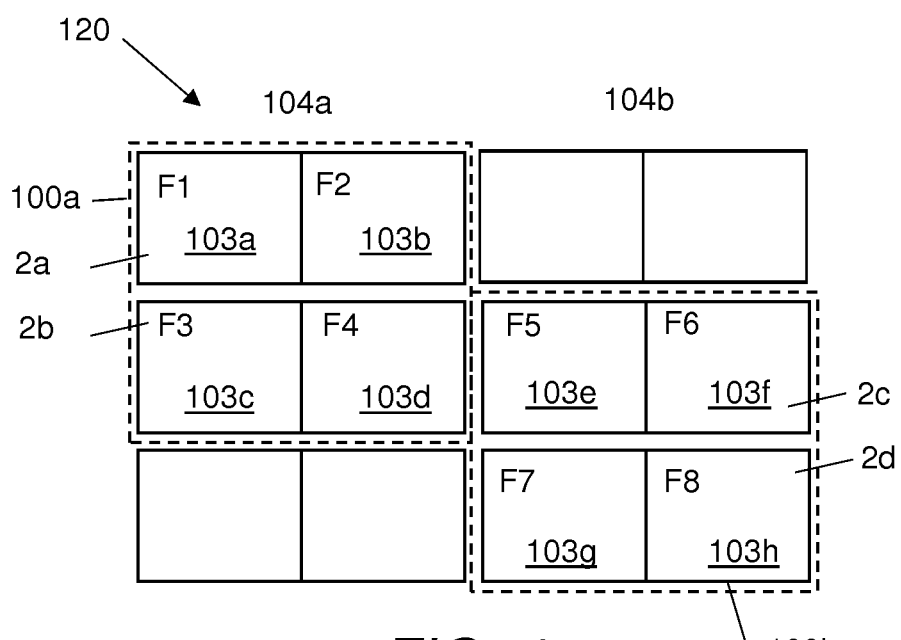

A further example is provided in FIG. 4, array 120. Array 120 is similar to array 110, except that the fourth subpixel area 103d of the first pixel 100a is adjacent to the fifth subpixel area 103e of second pixel 100b.

In examples of array 110 and array 120, the first color effect of the first color filter may be substantially the same hue as the fifth color effect of the fifth color filter, the second color effect of the second color filter may be substantially the same hue as the sixth color effect of the sixth color filter, and the third color effect of the third color filter may be substantially the same hue as the seventh color effect of the seventh color filter. By substantially the same color effect, it is for example where the color effect is the same hue or luminance per subpixel area within acceptable tolerances. This may provide for a regular ordering of subpixel areas including similar display effects in the array. In further examples, the first, second, and third color effects may be a red hue, a green hue, and a blue hue respectively.

In yet further examples the first, second, third color filters are respectively a green hue filter, a blue hue filter and a red hue filter. The fourth subpixel area corresponds with a white filter.

In examples the following rules may be applied for arranging the color filters including the white filter: a red hue filter and green hue filter should be each in a different display element, and the white filter is positioned adjacent to the green hue filter.

Figure 5:
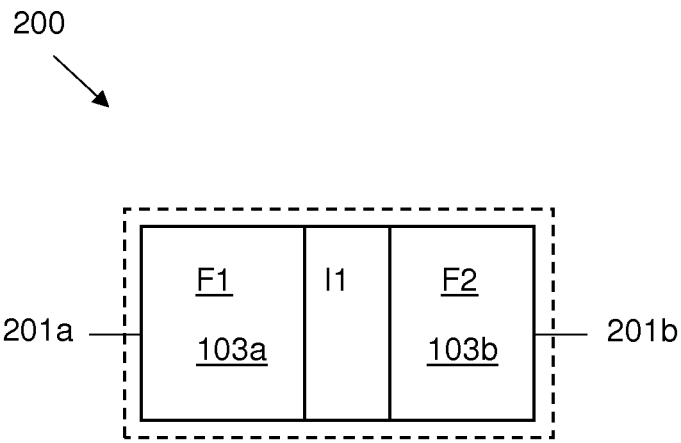
FIGS. 5, 6, 7, and 8 are plan views showing different examples of electrowetting elements with white filters.

In order to provide improved luminance, further examples include white filters. For example, FIG. 5 depicts electrowetting display element 200. Display element 200 is similar to display element 2, and includes similar features to display element 2. Display element further includes for example the feature that first color filter F1 extends to a first edge of the electrowetting element 200, or edge 201a, and second color filter F2 extends for example to a second edge of the electrowetting element 200, or edge 201b. This is not intended to be limiting, however, as first and second color filters F1 and F2 may extend to contact the other edges of electrowetting element 200 as well. Display element 200 further includes first white filter I1, positioned between first and second color filters F1 and F2. The first white filter I1 corresponds with a white filter. Because first and second filters F1 and F2 extend to the edge of the electrowetting element 200 and the white filter is included inside the cell between filters F1 and F2, where the first fluid may easily provide coverage, it may be possible to provide improved combined display unit color effects. In particular, it may be possible to provide greater luminance regulation without sacrificing the ability to control color effects for hue.

In examples, the first color filter is for a substantially different hue than the second color effect. This may provide the ability to generate primary and secondary color hues.

In examples, the first white filter may be substantially equal to 50% of a total area of the combined first filter area and the second filter area. Substantially 50% may for example be that the first white filter may cover 40-60% of the combined first and second filter areas. This may provide for adequate luminance in a display element.

Figure 6:
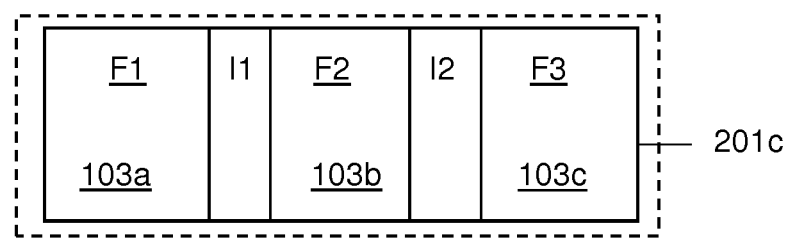

In examples, display element 200 may include further subpixel areas. For example, display element 210 is depicted in FIG. 6. Display element 210 is similar to display element 200, except that display element 210 further includes a third subpixel area 103c of the surface, a third electrode, and a third color filter F3. The third electrode may substantially overlap the third display area, and the third color filter F3 substantially overlaps the third subpixel area. The third color filter F3 is configured to effectuate a third color effect, and may extend to a third edge of the electrowetting element 201c. The second subpixel area 103b is positioned between the first subpixel area 103a and the third subpixel area 103c. The first fluid is further configured to adjoin the third subpixel area 103c in dependence on the at least a first voltage applied using at least one of the first electrode, the second electrode, or the third electrode.

In examples, the first color effect, the second color effect, and the third color effect may be a red hue, a green hue, and a blue hue respectively. This may allow for display element 210 to provide a full color gamut.

In examples, a second white filter I2 may be positioned between the second filter F2 and the third filter F3. The second white filter I2 is configured to effectuate the white filter, similar to the first white filter I1. The example of display element 210 including first and second white filters I1 and I2 may allow for further control of luminance in a three color display element.

In further examples, the combined first white filter and the second white filter I1 and I2 may be equal to substantially 50% in size, within for example acceptable tolerances, of a combined first filter, second filter and third filter area 103a, 103b, and 103c. This may further provide for the ability to provide cells with the potential to generate a wide range of luminance over the full color gamut.

Figure 7:
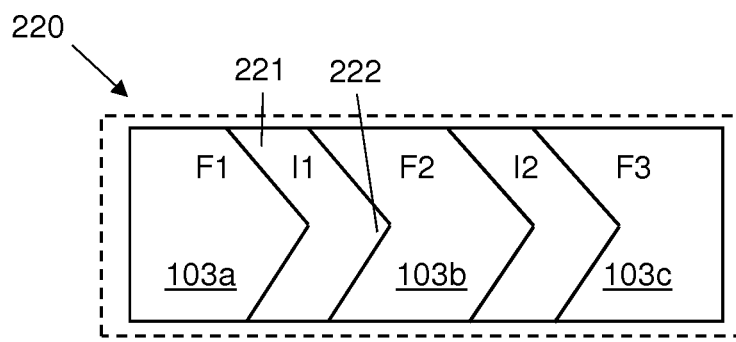

In examples, the first white filter of display element 200 or 210, or the second white filter of display element 210 may be V-shaped. As may be seen in FIG. 7, display element 220 is similar to display element 210, except that it includes first and second intermediate areas I1 and I2 that include V-shapes, or chevron shapes. By shaping the first and intermediate regions to include a tail region 221 shifted longitudinally with respect to a point region 222, it is possible to vary the rate at which the white filters are included in the display element color effects as the first, second, and third electrodes vary the position of a first fluid across display element 220. In other examples, the first white filter substantially overlaps an area of the surface of the support plate which is one of: V-shaped, circular, triangular, rectangular or having a three pointed star shape.

Figure 8:
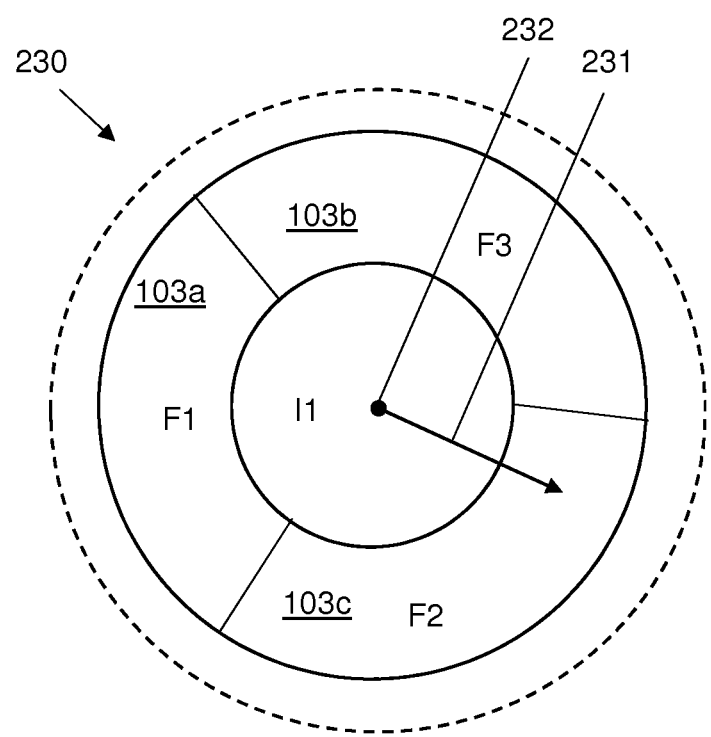

In further examples, three subpixel areas may surround a white filter. For example FIG. 8 depicts display element 230. Display element 230 includes a first subpixel area 103a, a second subpixel area 103b, and a third subpixel area 103c. Each subpixel area corresponds with a respective color filter and a respective electrode substantially overlapping the respective display area and configured to effectuate a respective color effect. A first white filter I1 is positioned between the first color filter, the second color filter, and the third color filter, and is configured to effectuate a white effect. The first white filter I1 is positioned such that any axis 231 pointing outward from a substantially, for example within acceptable measuring tolerances, central point 232 of the first white filter I1, and substantially, for example within acceptable geometric variations, in a plane of at least one of the first subpixel area, the second subpixel area or the third subpixel area, intersects at least one of the first subpixel area, the second subpixel area, or the third subpixel area. A first fluid for example similar to the first fluid described previously is configurable to adjoin at least a first part of at least one of the first subpixel area, the second subpixel area, or the third subpixel area in dependence on at least a first voltage applied using at least one of the first electrode, the second electrode, or the third electrode. Display element 230 further includes a second fluid similar to that described previously and immiscible with the first fluid. Display element offers the features of providing an efficient operation; it is easy to move the first fluid to cover at least part of the first, second, and third subpixel areas to obtain any combination of first, second, or third color effects. In the example where the first, second, and third color effects are a red hue, a green hue, and a blue hue respectively, any primary or secondary color effect on the color gamut may be available. Moreover, the white filter I1 allows for the simple incorporation of white filters to control the luminance of a hue.

Figure 13:
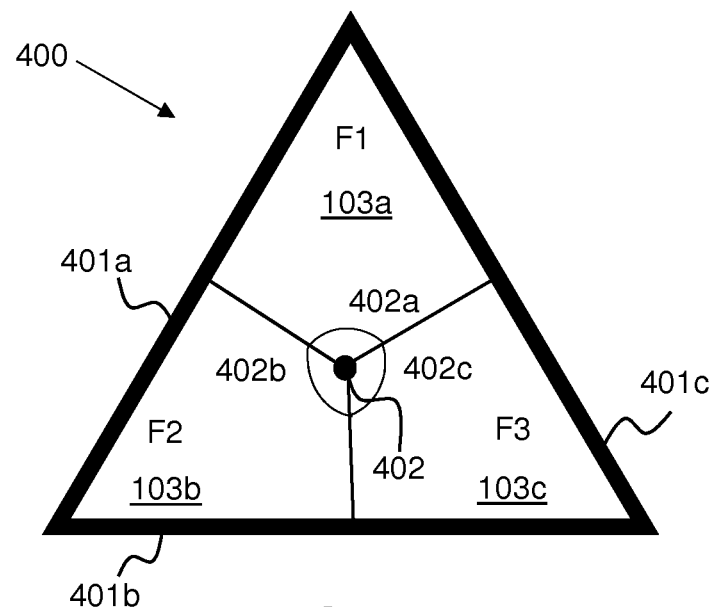
FIGS. 13, 14, 15, 16, 17, and 18 are plan views showing different examples of electrowetting elements with three display areas.
Figure 17:
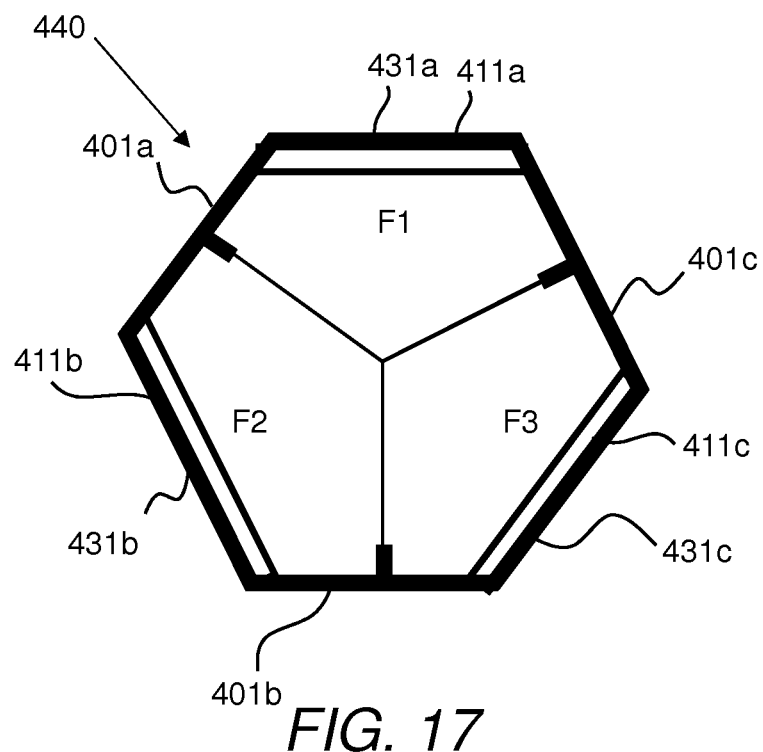
Figure 18:
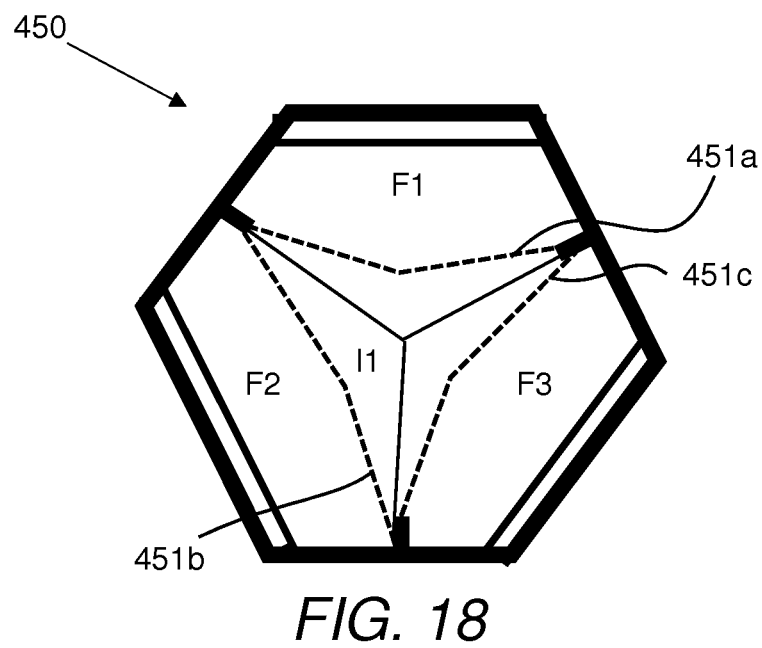

In examples, display element 230 may include a wall. For example, display element 230 may include a substantially, for example within acceptable geometric variations, triangle-shaped wall surrounding a combined area of the first subpixel area, the second subpixel area and the third subpixel area. For example, FIG. 13 depicts display element 400. In further examples, display element 230 may include a substantially, for example within acceptable geometric variations, hexagonal-shaped wall surrounding a combined area of the first subpixel area, the second subpixel area, and the third subpixel area. For example, FIG. 17 depicts display element 440. In examples, the first white filter may comprise at least one tapered area, for example tapering outwards, positioned between at least two of: the first filter, the second color filter, or the third color filter. Therefore, with the first white filter substantially overlapping an area of the surface, the overlapped area comprises the at least one tapered sub-area positioned between at least two of the first, second and third subpixel areas. For example, FIG. 18 depicts display element 450. The beneficial features of triangular and hexagonal walls and white filters with tapered areas are discussed below in the discussion relating to the example figures.

In examples, display element 230 may include at least one additional subpixel area of the surface. The display element 230 may include at least one additional color filter substantially overlapping the at least one additional subpixel area and configured to effectuate at least one additional color effect, the at least one additional color filter extending for example to at least one edge of the electrowetting element, wherein any axis 231 pointing outward from the substantially central point 232 of the first white filter, and substantially in a plane of at least one of the first subpixel area, the second subpixel area or the third subpixel area, intersects at least one of the first subpixel area, the second subpixel area, the third subpixel area, or the at least one additional subpixel area.

In further examples of display elements 200, 210, 220, or 230 the first fluid may be further configurable to adjoin a part of the first white filter, in dependence on the at least a first voltage applied using at least one of the first electrode or the second electrode. This may provide further configurability of luminance for the display element color effect. In display applications, fine special resolution is desirable to provide sharp vertical and horizontal lines. Arrays of electrowetting display elements or pixels may sometimes provide for limited array resolutions, however. This may be seen in the example array 300 depicted in FIG. 9. Array 300 is similar to array 110 in that it includes features relating to a first display unit 100*a*, including a first display element 102*a* and the second display element 102*b*.

Figure 9:
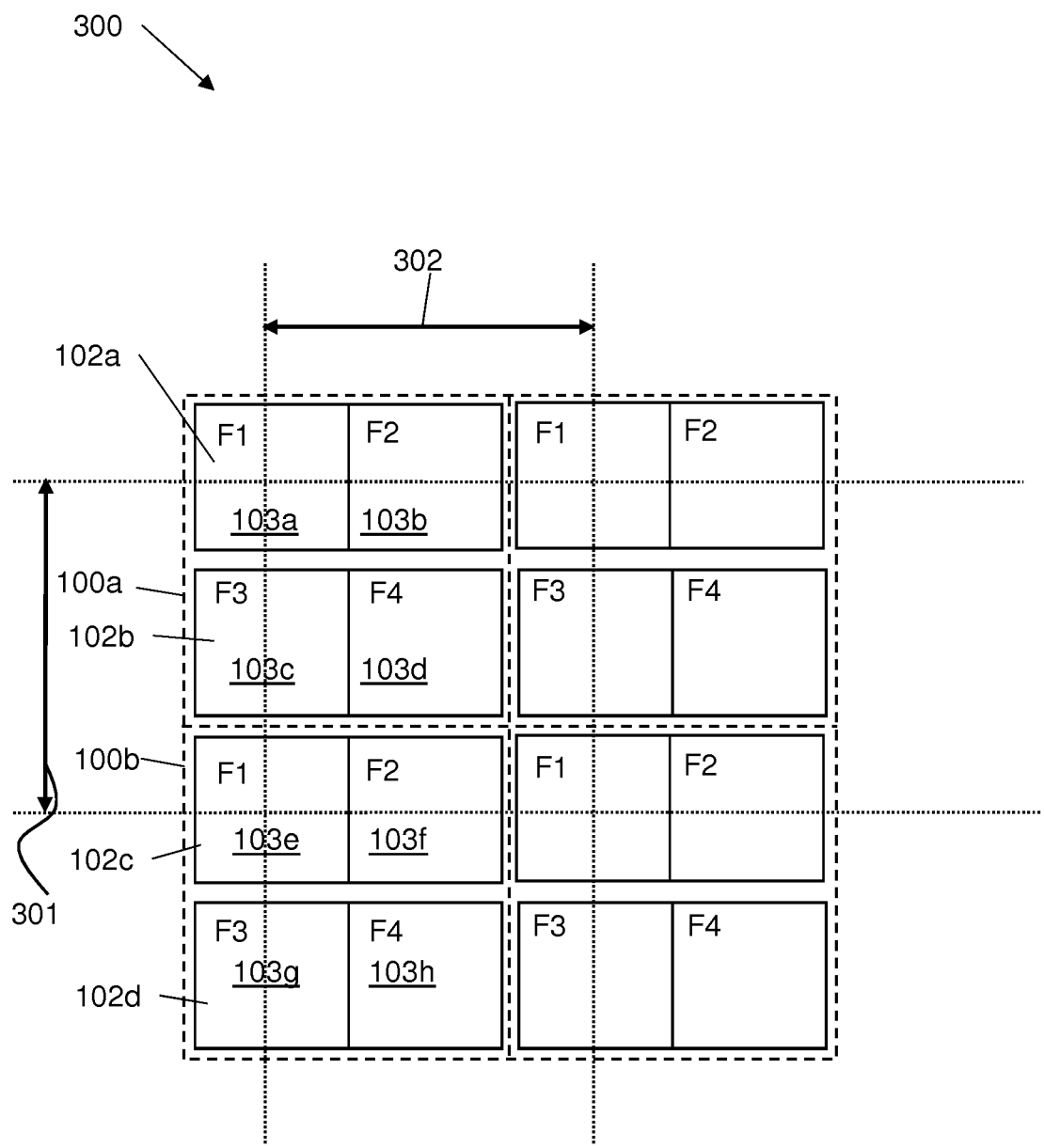
FIG. 9 is a plan view of an example electrowetting element array.

In examples, array 300 may further include a second pixel 100*b* including a third display element 102*c* and a fourth display element 102*d*. In examples, the fifth color filter is for the same hue as the first color filter F1, the sixth color filter is for the same hue as the second color filter F2, the seventh color filter is for the same hue as the third color filter F3, and the eighth color filter is for the same hue as the fourth color filter F4. This may provide the feature that the adjacent pairs of display elements of array 300 include similar patterns of similar color effects, as is depicted in FIG. 9 by the markings F1, F2, F3, and F4.

The luminance resolution of an array includes horizontal and vertical components. The horizontal luminance or vertical luminance is determined by the spacing of the one or more similar high luminance display areas within the array. In examples including display elements or pixels with three subpixel areas corresponding to the color effects red, green, and blue, the brightest color effect is typically green because green filters generally absorb less light than blue and red filters. In examples like array 300 that incorporate display elements or pixels with four subpixel areas corresponding to the color effects red, green, and blue, and white, however, the brightest color effects typically may be provided by a combination of green color and white filters. In order to form the highest resolution horizontal and vertical white lines in a display, it may be desirable to provide an array with equal horizontal and vertical resolutions, because a display may be limited to the lowest resolution of the two and may match with the square pixel pitch standards.

For example, if first subpixel area 103*a* corresponds to a first color effect including a green hue, and second subpixel area 103*b* corresponds to a second white filter green and white will align in the horizontal directions to create a horizontal resolution 302 that is equal to the spacing between the first and second subpixel areas, as indicated by a double-headed arrow. In the vertical direction, however, the spacing between subpixel areas corresponding to green color effects and white filters is for example the distance between first and second subpixel areas 103*a* and 103*b* and fifth and sixth subpixel areas 103*e* and 103*f*, however. Vertical resolution 301 is indicated by a double-headed arrow that spans the distance of two pixels. Therefore, the vertical and horizontal luminance resolutions for array 300 are each approximately 2:1, and the overall luminance resolution of array 300 may be limited to two display areas.

Figure 10:
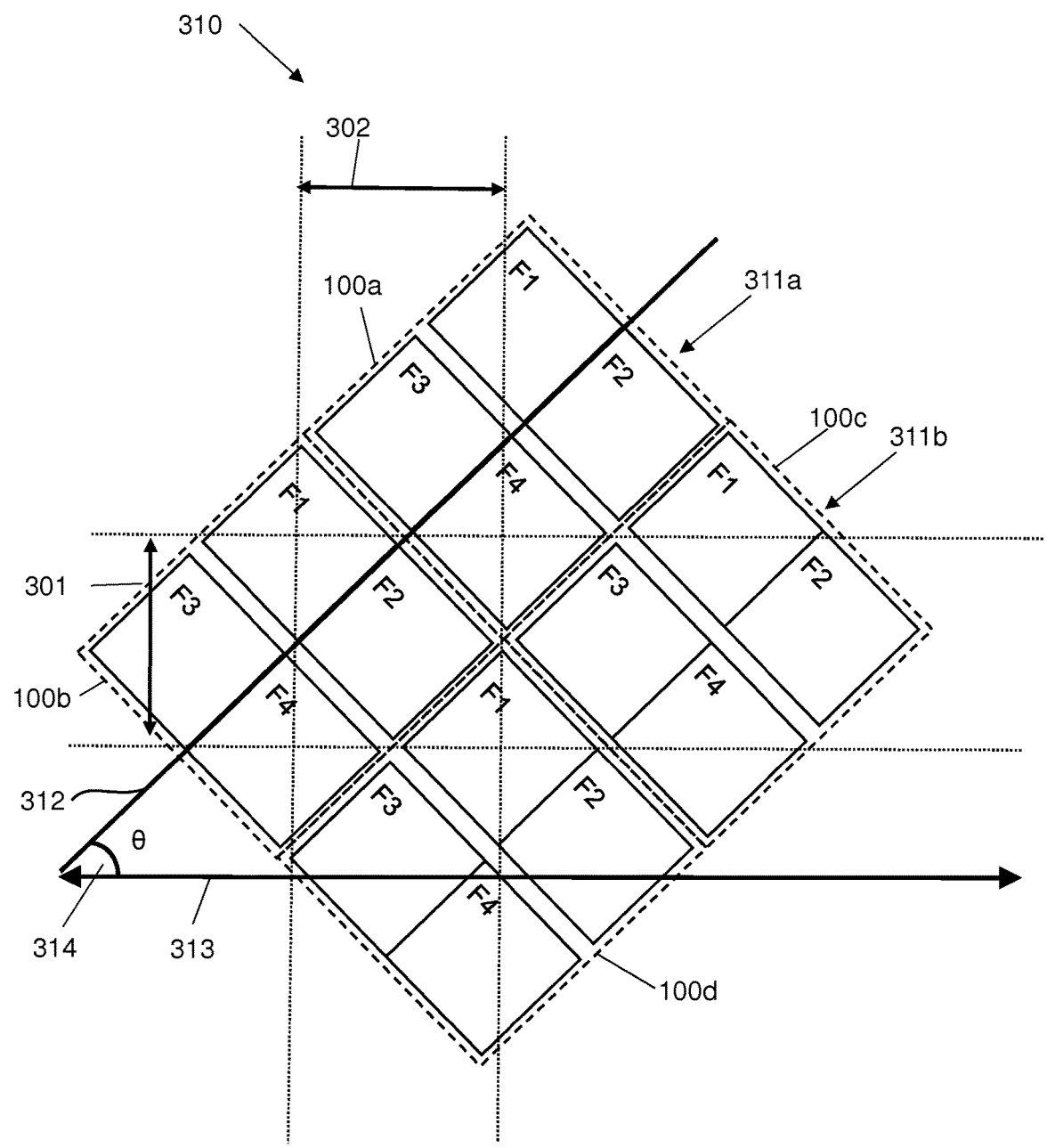
FIG. 10 is a plan view of an example array of electrowetting elements with an offset with respect to a display horizon.

The electrowetting pixel array 310 of FIG. 10 may improve the luminance resolution of a display apparatus. Array 310 is similar to array 300, including the first electrowetting pixel 100*a* including the first and second display elements 102*a* and 102*b*. First display element 102*a* and second display element 102*b* are positioned in a first array column 311*a*. First array column 311*a* has a first array column axis 312, or a central axis along which first array column axis 312 is oriented. A first column axis angle offset 314 is defined by the offset between the first array column axis 312 and a predetermined display horizon 313. The predetermined display horizon 313 is the horizon that images are aligned to when displayed on array 310. In examples, predetermined display horizon 313 may be oriented to align with a dimension or an edge of a display apparatus. In further examples, the predetermined display horizon 313 may be selectable by a user of a display apparatus. In the example of array 310, the first column axis angle offset 314 is substantially 45° from a predetermined display horizon. By substantially 45°, i.e. substantially 45 degrees, the first column axis angle offset may be 35° to 55° with respect to the predetermined display horizon, or in other examples 40° to 50° or 45° within acceptable measuring variations.

In examples the first and third subpixels are located on a first column axis having the column axis angle offset of substantially 45° from the predetermined display horizon. In further examples the second subpixel and the fourth subpixel are located on a second column axis having the column axis angle offset of substantially 45° from the predetermined display horizon.

In examples where first and fourth subpixel areas correspond to green color effects and white filters, respectively, the green and white filters may be considered to be positioned on a diagonal from each other, and the orientation of array 310 provides an improvement in luminance resolution. In FIG. 10, it may be seen that with the first column axis angle offset 314, the first and fourth subpixel areas of a first and second pixel 100*a* and 100*b* may be aligned both horizontally and vertically in the array 310 so that vertical luminance resolution 301 and horizontal luminance resolution 302 are substantially equal, for example within acceptable measuring variations. In such examples the second subpixel area may correspond with a blue hue filter and the third subpixel area may correspond with a red hue filter.

Examples may be used with the red color filter and the green color filter being in different electrowetting elements of a pixel and the white filter positioned diagonally from the green filter in the pixel. Therefore, in examples, at least one of the first color filter or the second color filter is a red hue filter, and at least one of the third color filter or the fourth color filter is a green hue filter. In other examples, at least one of the first color filter or the second color filter is a blue color filter, and at least one of the third color filter or the fourth color filter is a white filter.

In further examples, array 310 may include a second array column 311*b*. The second array column 311*b* may include a third pixel 100*c* and a fourth pixel 100*d*, which are similar to the first and second pixels 110*a* and 100*b* described above. The second array column 311*b* may include a second column axis angle offset 314 that is substantially 45° from a predetermined display horizon.

In examples, the support plate in plan view is substantially rectangular or substantially square, for example rectangular or square within acceptable tolerances. At least one side of such a substantially rectangular or substantially square is substantially parallel the predetermined display horizon. In these examples of further examples a seal may be positioned on the support plate, surrounding the array of electrowetting elements, and sealing the support plate to the second support plate. In plan view the seal may be substantially rectangular or substantially square, with at least one side of the substantially rectangular or substantially square seal being substantially parallel the predetermined display horizon.

In further examples, a wall layer (which for example forms the walls described elsewhere herein) on part of the surface of the support plate has a grid shaped pattern and at least one grid axis of the grid shaped pattern is offset by substantially 45° from at least one side of the support plate.

In other examples, the first subpixel area and the fourth subpixel area are each substantially square. In a plane of the first subpixel area and the fourth subpixel area, a first corner and an opposing second corner of the first subpixel area and a first corner of the fourth subpixel area and an opposing second corner of the fourth subpixel area are located substantially on a linear axis.

In yet further examples the second subpixel area and the third subpixel area are each substantially square. In a plane of the second subpixel area and the third subpixel area, a first corner and an opposing second corner of the second subpixel area and a first corner and an opposing second corner of the third subpixel area are located substantially on a linear axis.

Arrays including triple display elements can present similar luminance resolution asymmetries as those identified with regards to array 310. Electrowetting display element array 320 provides an example of an array composed of display elements including three color filters. Array 320 is like array 300, but the first display element 102a further includes a fifth subpixel area 103e adjacent to the second subpixel area 103b, and the second display element 102b includes a sixth subpixel area 103f adjacent to the fourth subpixel area 103d. The fifth subpixel area 103e corresponds to a respective fifth color filter and a fifth electrode, and the sixth subpixel area 103f includes a sixth color filter and a sixth electrode. The first fluid is further configurable to adjoin at least part of the fifth subpixel area in dependence on the at least the first voltage applied using the third electrode, and the third fluid is further configurable to adjoin at least part of the sixth subpixel area in dependence on the at least the second voltage applied using the sixth electrode.

In the example of array 320, the first color effect of the first color filter is substantially the same as the third color effect of the third color filter, the second color effect of the second color filter is substantially the same as the fourth color effect of the fourth color filter, and the fifth color effect of the fifth color filter is substantially the same as the sixth color effect of the sixth color filter, as is indicated by the labels F1, F2, and F3. For example, the first color effect, the second color effect, and the third color effect may be a red hue, a green hue, and a blue hue respectively.

Figure 11:
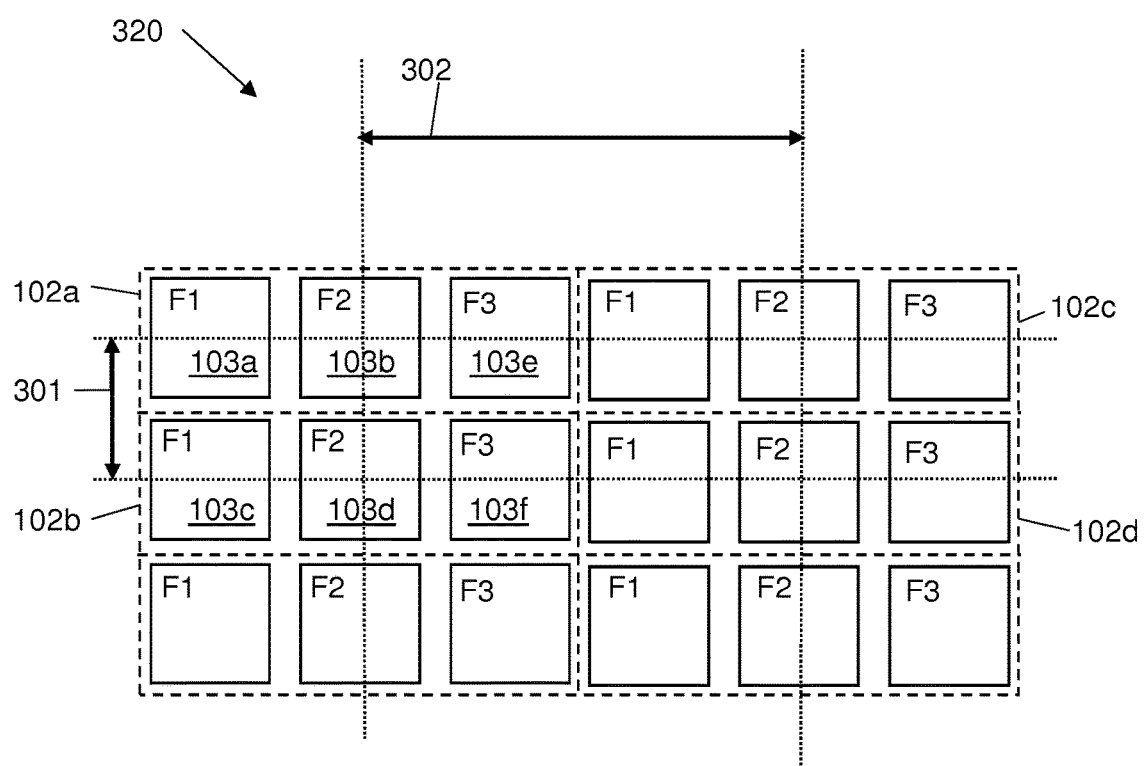
FIG. 11 is a plan view of an example electrowetting element array.

As may be seen in FIG. 11, if the second subpixel area 103b and fourth subpixel area 103d correspond to the green hue, the color effect with the highest luminance, the horizontal resolution 302 is twice the vertical resolution 301. Different horizontal and vertical luminance resolutions are undesirable because generally, the total luminance resolution of the array will be limited to the lower resolution.

In examples, array 320 may incorporate further features. Array 330 is similar to array 320, including first display element 102a and second display element 102b. Array 330 further includes a first array column 311a in which the first display element 102a and second display element 102b are positioned. Like array 310, array 330 includes a first array column axis angle offset 314 that is substantially 45° from the predetermined display horizon.

Figure 12:
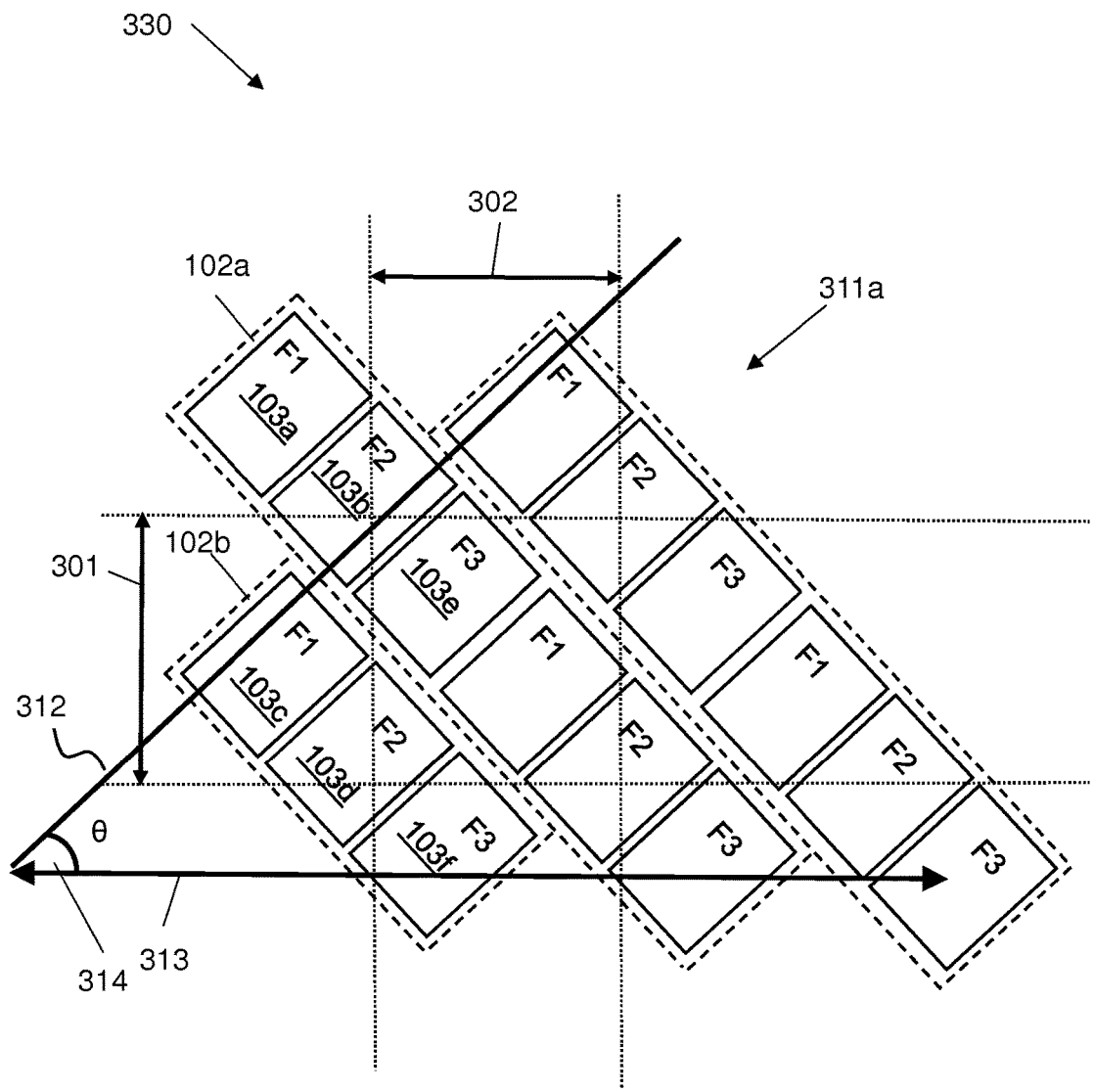
FIG. 12 is a plan view of an example electrowetting element array offset with respect to a display horizon.

In examples of array 330, the third subpixel area 103c may be adjacent to the second subpixel area 103b and the fifth subpixel area 103e. As may be seen in FIG. 12, this may produce a shift between the first and second display elements 102a and 102b within the array. In such an orientation, if the second subpixel area 103b and fourth subpixel area 103d correspond to a green hue, the color effect with the highest luminance, the horizontal resolution 302 is equal to the vertical resolution 301. The array 330 therefore includes substantially equal, within acceptable variations, horizontal and vertical luminance resolution, which may be ideal for generating display effects with crisp or sharp or accurate horizontal and vertical lines.

In examples, arrays 310 and 330 may have display elements with a first white filter corresponding to a region positioned between the first color filter and the second color filter and able to effectuate a first white effect. In further examples, array 330 may include a second white filter corresponding to a region positioned between the second filter and the third filter and able effectuate a second white effect.

In further examples, array 330 may include a second array column 311b. The second array column 311b may include a third pixel 100c and a fourth pixel 100d, which are similar to the first and second pixels 110a and 100b described above with respect to array 330. The second array column 311b may include a second column axis angle offset 314 that is substantially 45° from a predetermined display horizon.

Further examples of display elements including three display subpixels are provided, and will be described in relation to FIGS. 13, 14, 15, and 17. FIG. 13 depicts display element 400. Display element 400 is similar to display element 2, however it further includes a different number and arrangement of display areas. Display element 400 includes a support plate having a surface with a first subpixel area 103a, a second subpixel area 103b, and a third subpixel area 103c. The second subpixel area 103b is adjacent, for example adjoining or in contact with the first subpixel area 103a, and the third subpixel area 103c is adjacent to the first subpixel area 103a and the second subpixel area 103b. Like display element 2, each of the first, second, and third subpixel areas 103a, 103b, and 103c corresponds to a respective filter configured to effectuate a first color effect and an electrode. The first, second, and third electrodes are operable to move the first fluid quickly between the first, second, and third subpixel areas of the display element 400, providing for efficient operation.

In examples, the first color filter F1, the second color filter F2, and the third color filter F3 are positioned respectively so that an edge of each of the first second and third color filters subtends a substantially equal angle from a substantially central point 402 positioned between the first color filter F1, the second color filter F2, and the third color filter F3. In examples, substantially central point 402 may be positioned at a central point within display element 400, for example substantially equidistant from first, second, and third wall portions 401a, 401b, and 401c. In further examples, substantially central point 402 may be positioned at a meeting point between the first, second, and third color filters F1, F2, and F3. In the example of display element 400, if the first, second, and third color filters F1, F2, F3 each substantially overlap and cover the same surface area as their respective subpixel areas, an edge of the first filter F1 subtends an angle 402a, an edge of the second filter F2 subtends an angle 402b, and an edge of the third filter F3 subtends an angle 402c with respect to the substantially central point 402. As may be seen in FIG. 13, each of angles 402a, 402b, and 402c are substantially equal, or between 50° and 70°. This may provide an approximately equal distribution of filters between which the first fluid may easily travel to provide combined display element color effects in a compact design.

In examples, display element 400 may have a first color effect for the first filter, a second color effect for the second filter, and a third color effect for the third filter which are a red hue, a green hue, and a blue hue respectively. This may allow display element 400 to generate a wide range of color effects, including any primary or secondary hue.

Display element 400 further comprises a wall 20 surrounding the first subpixel area, the second subpixel area, and the third subpixel area. The wall incorporates a first wall portion 401a adjacent to the first subpixel area 103a and the second subpixel area 103b, a second wall portion 401b adjacent to the second subpixel area 103b and the third subpixel area 103c, and a third wall portion 401c adjacent to the third subpixel area 103c and the first subpixel area 103a. In the example of display element 400, each of the first wall portion 401a, the second wall portion 401b, and the third wall portion 401c are substantially straight within acceptable geometric tolerances and the wall is operable to retain or confine the first fluid within the electrowetting element. The wall may prevent the first fluid from moving too far from the subpixel areas covered by the filters. In the example of display element 400 provided in FIG. 13, it may be seen that the first, second, and third wall portions 401a, 401b, 401c meet together at three apexes to form a triangular shape. This is not intended to be limiting, however, as further wall configurations are contemplated, as discussed below. The display element wall 20 may further allow display element 400 to be placed into array orientations that provide further benefits, as further discussed below.

Figure 14:
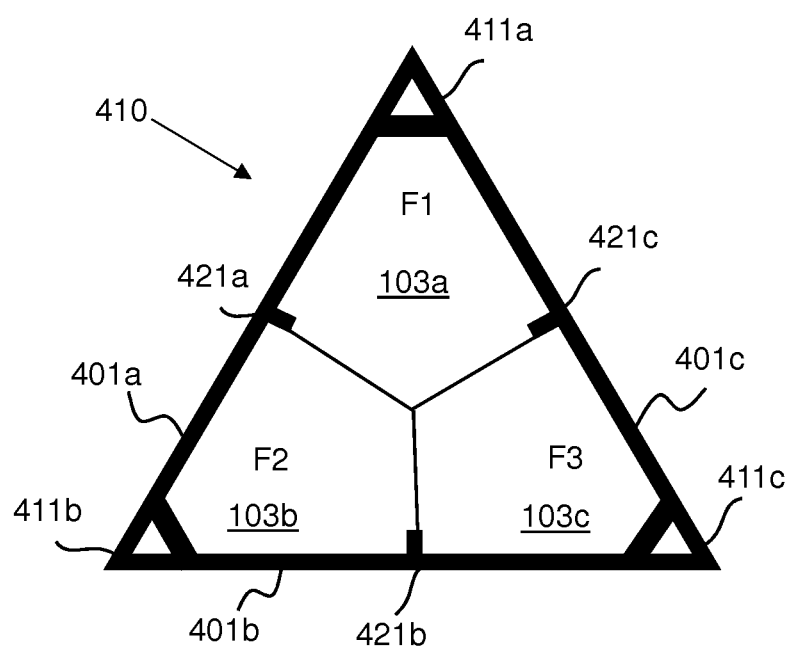

In examples, display element 400 may further comprise a first initiation area 411a, a second initiation area 411b, and a third initiation area 411c, as shown in FIG. 14. The first initiation area 411a is adjacent to the first wall portion and the third wall portion, the second initiation area 411b is adjacent to the first wall portion and the second wall portion, and the third initiation area 411c is adjacent to the second wall portion and the third wall portion. Each initiator 411a, 411b, and 411c is for example an initiator of fluid motion comprising an area of the surface of the support plate with a wettability that is substantially different from a subpixel area wettability of at least one of the first subpixel area, the second subpixel area, or the third subpixel area. For example the initiation area may be more wettable to the second fluid than to the first fluid, and may for example be a hydrophilic area, to create a line along which fluid motion initiates due to a change in thickness of the first fluid close to the initiation area due to an aversion of the first fluid to wet the initiation area. In examples, the first, second, and third initiation areas may prevent the first fluid from traveling into an apex between wall portions of a wall, which it may be inefficient to move the first fluid out of later. Alternatively, the initiation areas may keep the first fluid substantially centrally located in the display element 400, allowing for efficient operation of display element 400.

In examples, initiation areas may be used to provide further color effects. For example, at least one of the first initiation area, the second initiation area, or the third initiation area may be configured to effectuate a white effect, and for example may each or at least one be a white filter. This may help to brighten a display image. In further examples, at least one of the first initiation area, the second initiation area, or the third initiation area may be configured to effectuate a substantially black effect, and may for example be a black filter. Substantially black may comprise a minimum of luminance. To the human eye, black is dark, the absence of luminance, and may include no distinguishing color hues.

Display element 400 may include one or more protrusions. A protrusion is for example a section of wall that may prevent or reduce movement, reorientation, or segmentation of the first fluid on the subpixel areas adjacent to the protrusion. For example, display element 410 includes a first protrusion 421a of the wall adjoining the first wall portion 401a, at least a portion of the first protrusion 421a positioned between the first subpixel area 103a and the second display area 103b; a second protrusion 421b of the wall adjoining the second wall portion 401b, at least a portion of the second protrusion 421b positioned between the second subpixel area 103b and the third subpixel area 103c; and a third protrusion 421c of the wall adjoining the third wall portion, at least a portion of the third protrusion 421c positioned between the third subpixel area 103c and the first subpixel area 103a.

Figure 15:
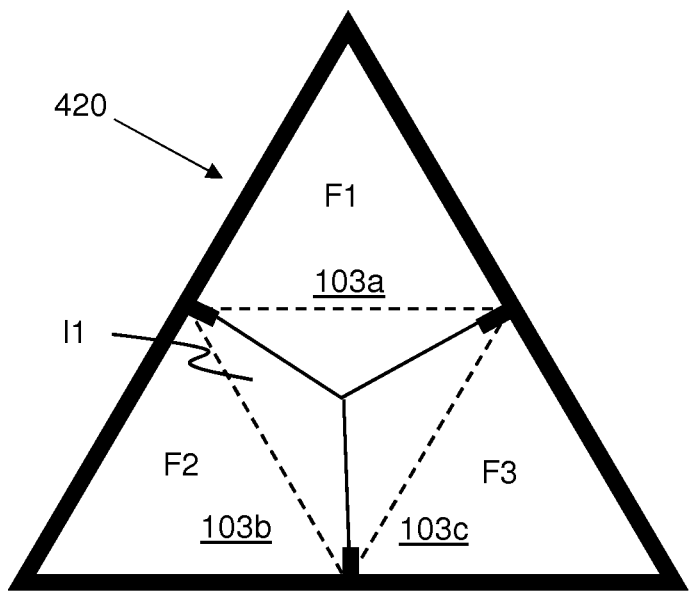

In examples, display element 400 may further include a first white filter. For example FIG. 15 depicts display element 420, which is similar to display element 400 and includes all of the same features which are the same, but further includes white filter I1. White filter I1, surrounded by dotted lines, is positioned between the first filter F1, the second filter F2, and the third filter F3, the white filter I1 configured to effectuate a white effect. A white filter may allow display element 420 to control luminance. While the example of 420 includes a white filter I1 shaped as a triangle between the first, second, and third filters those of skill in the art will understand that in further examples other configurations are possible, as will be described below.

In examples, at least a first portion of at least one of the first subpixel area 103a, the second subpixel area 103b, or the third subpixel area 103c are further configurable to effectuate a pixel color effect comprising a plurality of combined display unit luminance values for a predetermined pixel hue. In further examples, at least one combined pixel luminance of the plurality of combined display unit luminance is greater than a maximum of a first subpixel area luminance, a second subpixel area luminance, and a third subpixel area luminance.

Figure 16:
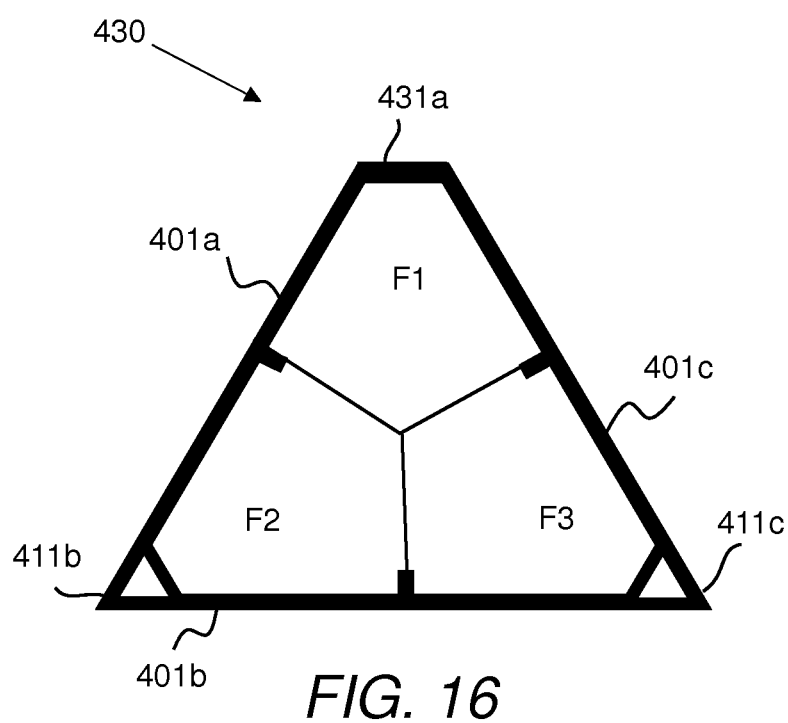

FIG. 16 provides an example of a display element with a first further wall portion. Display element 430 is similar to display element 400, and further comprises first further wall portion 431a connecting the first wall portion 401a to the third wall portion 401c, wherein the first further wall portion 431a is substantially straight. An angle between an inner side of the first wall portion and an inner side of the first further wall portion, and an angle between an inner side of the third wall portion and the inner side of the first further wall portion may be substantially the same and are each an acute angle. FIG. 16 depicts the first further wall portion 431a removing a relatively small portion of the apex formed by first and third wall portions 401a and 401c, however this is not intended to be limiting. As will be further shown, other proportions are possible. Display element 430 also includes first and second initiation areas 411b and 411c. In examples, any combination of further wall portions and initiation areas are possible. It is also possible to combine a further wall portion and an initiation area at the same apex between any two of first, second, and third wall portions 401a, 401b, and 401c.

For example, display element 440 depicted in FIG. 17 includes a second further wall portion and a third further wall portion to form a substantially hexagonal shape. The second further wall portion 431b connects the first wall portion 401a to the second wall portion 401b. The third further wall portion 431c connects the second wall portion 401b to the third wall portion 401c. In the example of display element 440, the second and third further wall portions are substantially straight. In the example display element 440 further comprises first, second, and third initiation areas 411a, 411b, and 411c. This is not intended to be limiting, however, as example display element 440 may have fewer initiation areas or no initiation areas.

Display element 440 may further include a first white filter between the first, second, and third subpixel areas which first white filter provides a white effect. For example, FIG. 18 depicts hexagonal-shaped display element 450. Display element 450 includes white filter I1, which is shaped to include three tapered areas, first tapered area 451a, second tapered area 451b, and third tapered area 451c. The tapered areas 451a, 451b, and 451c of display element 450 may provide further modulation of combined display element luminance.

Figure 19:
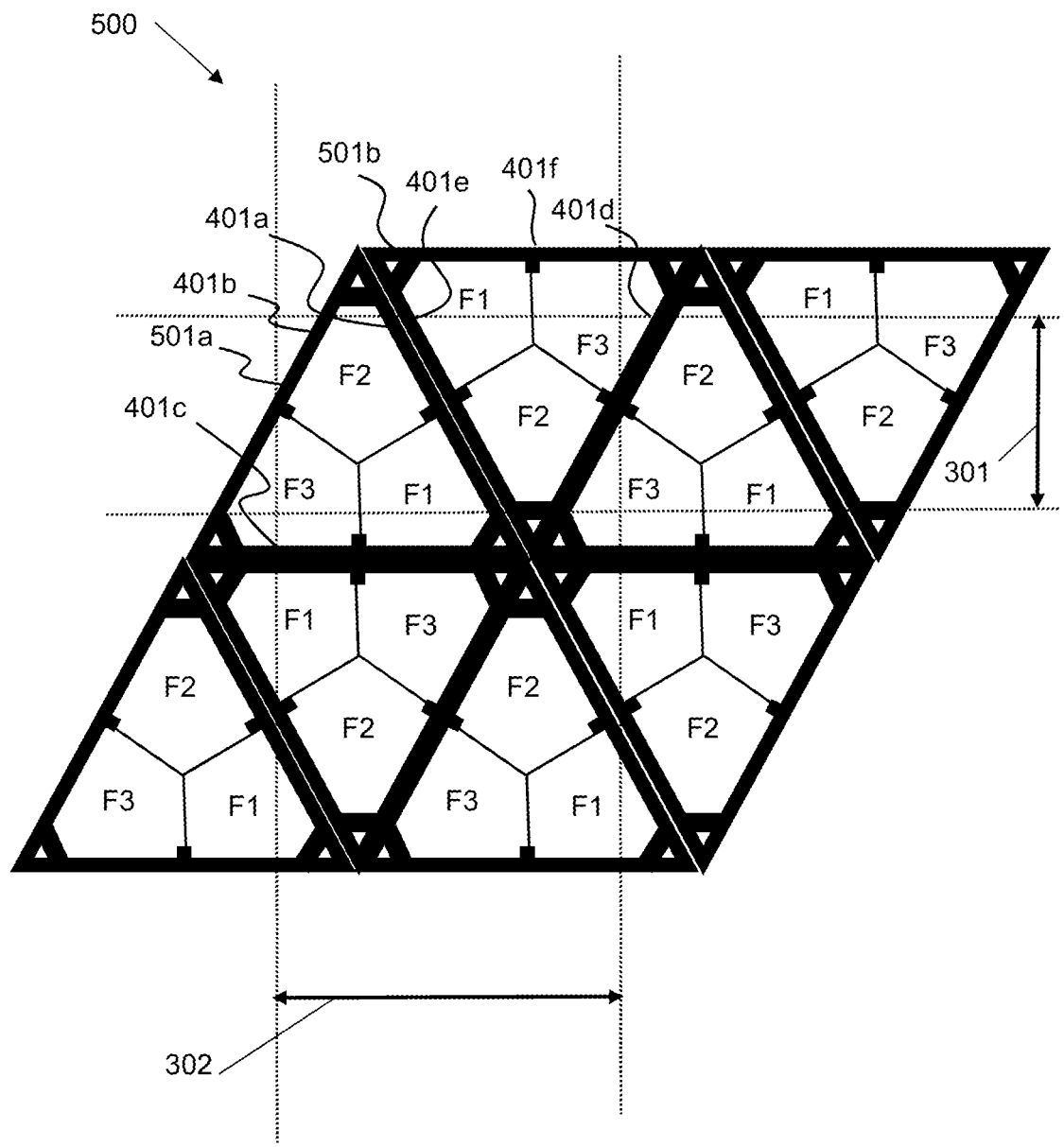
FIGS. 19, 20, 21, and 22 are plan views of example electrowetting element arrays.

Display elements 400 and 410 may be incorporated into an array to provide further benefits and features. For example, FIG. 19 depicts an array of electrowetting display elements 500. Array 500 includes a first electrowetting element 501a and a second electrowetting element 501b, which may include all or any of the features described for display elements 400 and 410.

Array 500 includes a support plate having a first surface region and a second surface region. The first electrowetting element 501a includes all or any of the features described regarding the display elements 400, 410, and 420. The second electrowetting element 501b, positioned adjacent to the first electrowetting element 501a, includes the same features as first display element 501a, but is referenced and oriented as follows. The second display element 501b includes a fourth subpixel area, a fifth subpixel area adjacent to the fourth subpixel area, a sixth subpixel area adjacent to the fourth subpixel area and the fifth subpixel area, all of the fourth, fifth, and sixth subpixel areas being part of the second display region of the surface. The fourth, fifth, and sixth subpixel areas correspond with respective filters and electrodes. A third fluid, immiscible with a fourth fluid, is configurable to adjoin at least a second part of at least one of the fourth subpixel area, the fifth subpixel area, or the sixth subpixel area, in dependence on at least a second voltage applied using at least one of the fourth electrode, the fifth electrode, or the sixth electrode. The second display element further includes a second wall surrounding the fourth display area, the fifth display area, and the sixth display area. The second wall includes a fourth wall portion adjacent to the fourth subpixel area and the fifth display area, a fifth wall portion adjacent to the fifth subpixel area and the sixth subpixel area, and a sixth wall portion adjacent to the sixth subpixel area and the fourth subpixel area. Each of the fourth wall portion, the fifth wall portion, and the sixth wall portion are substantially straight and the second wall is operable to retain the third fluid within the second electrowetting element, and the first wall portion adjacent to the fifth wall portion.

As it may be seen in FIG. 19, array 500 may provide an orderly layout of display elements, wherein each wall portion of each display element substantially overlaps with a wall portion of an adjacent display element.

In examples, the first color effect may be substantially the same as the fourth color effect; the second color effect may be substantially the same as the fifth color effect; and the third color effect may be substantially the same as the sixth color effect. In FIG. 19, this is represented by the placements of the first, second, and third filters F1, F2, and F3.

In examples, it may be desirable to provide a substantially equal horizontal and vertical luminance resolution. In display elements with subpixel areas corresponding with red, green, and blue color effects, the subpixel areas corresponding with red and green have the most luminance, and may therefore be used to create bright horizontal and vertical lines. Therefore, in examples the first color effect may be a green hue, the second color effect may be a blue hue, and the third color effect may be a red hue. As depicted in FIG. 19, this may provide a substantially equal vertical luminance resolution 301 and a horizontal luminance resolution 302. It may also be used for the brightest color effects to be aligned with the horizontal and vertical axes.

Figure 20:
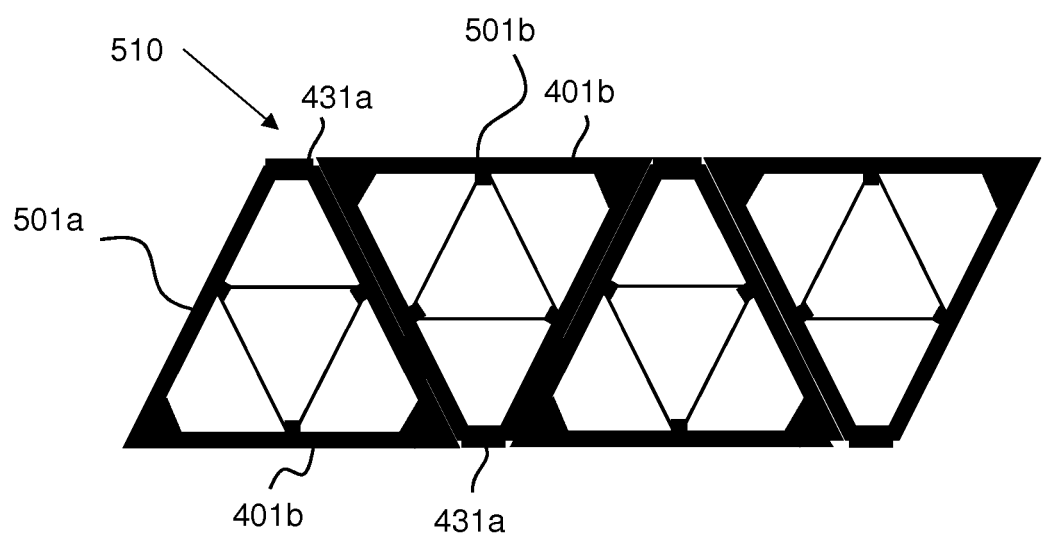

Display element 430 may also be incorporated into an array. FIG. 20 depicts array 510. Array 510 comprises at least a first display element 501a and a second display element 501b, both of which include a first further wall portion 431a. The first display element is positioned so that the first further wall portion is level with the second wall portion 401b of the second display element 501b. Additional display elements are positioned along the row with their respective first further wall portions 431a facing alternating directions.

Figure 21:
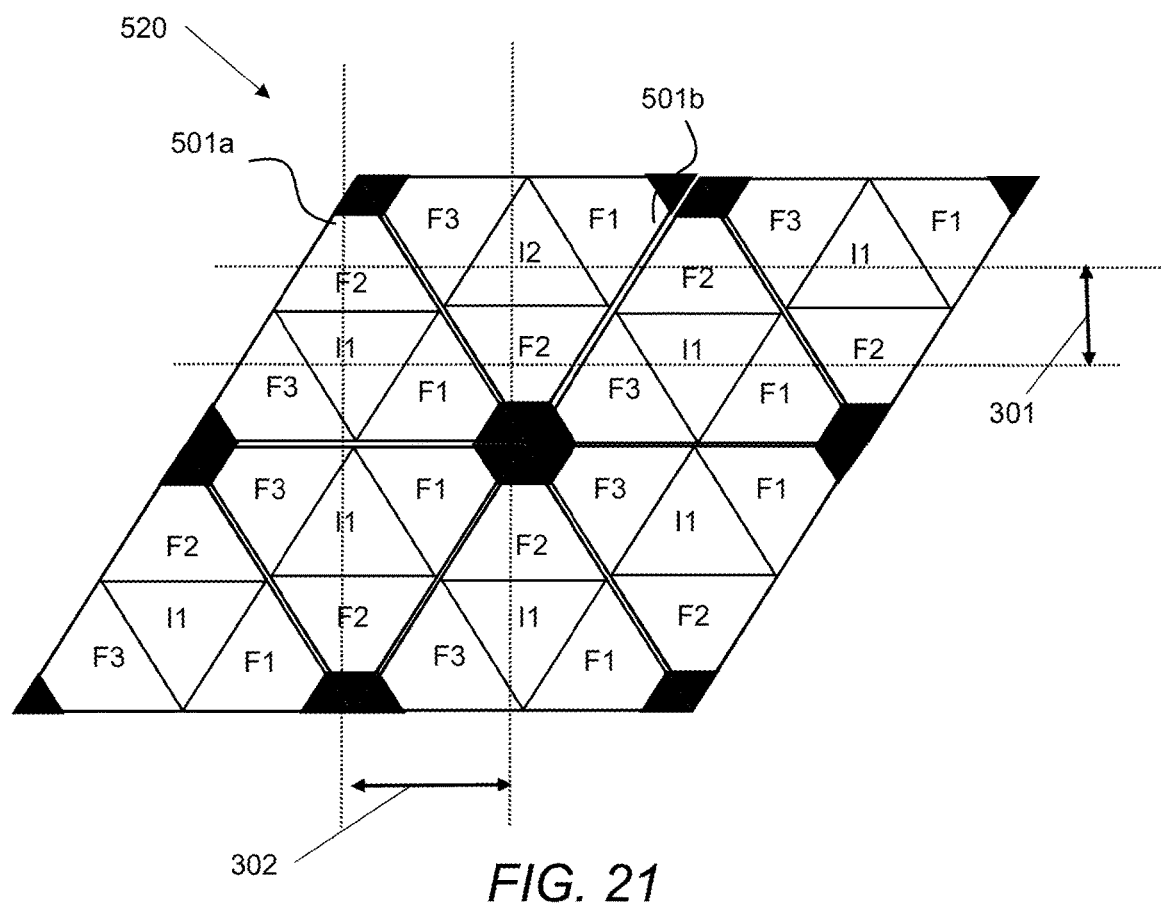

Display element 420 may be incorporated into an array to provide further benefits and features. For example, FIG. 21 depicts an array of electrowetting display elements 520. Array 520 includes a first electrowetting element 501a and a second electrowetting element 501b, which may include all of the features described for display element 420. Array 520 is similar to array 500, except that it includes first white filter I1 between the first, second, and third filters, and a second white filter I1 between the fourth, fifth, and sixth filters (labelled F1, F2, and F3) as depicted in FIG. 21. In arrays with subpixel areas including white filters, the subpixel area corresponding with the green hue color effect may be the color effect with the most luminance. Therefore, in examples, the first color effect may be a blue hue, the second color effect may be a green hue, and the third color effect may be a red hue. This may provide a substantially equal horizontal luminance resolution 302 and vertical luminance resolution 301, as may be seen in FIG. 21.

Figure 22:
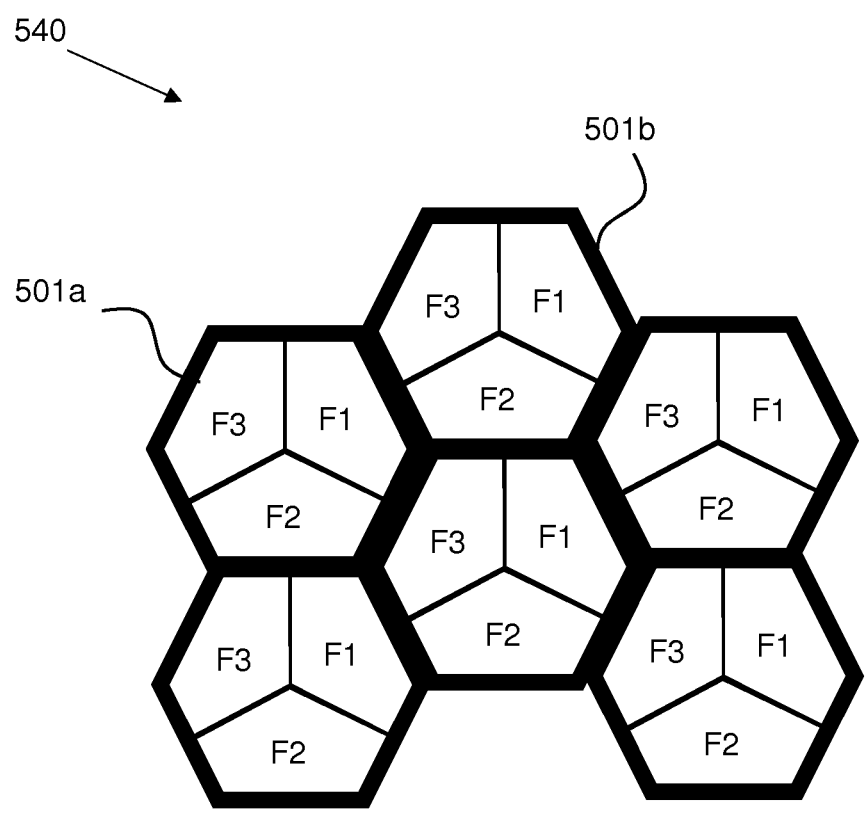

Display elements 440 and 450 may also be incorporated into an array. FIG. 22 depicts array of display elements 540. Array 540 includes a support plate having a first surface region and a second surface region. The first electrowetting element 501a includes the features described regarding the display elements 440. The second electrowetting element 501b, positioned adjacent to the first electrowetting element 501a, includes the same features as first display element 501a, but is referenced and oriented as follows. The second display element 501b includes a fourth subpixel area, a fifth subpixel area adjacent to the fourth subpixel area, a sixth subpixel area adjacent to the fourth subpixel area and the fifth subpixel area, all of the fourth, fifth, and sixth subpixel areas being part of the second display region of the surface. The fourth, fifth, and sixth subpixel areas include respective filters and electrodes. A third fluid, immiscible with a fourth fluid, is configurable to adjoin at least a second part of at least one of the fourth subpixel area, the fifth subpixel area, or the sixth subpixel area, in dependence on at least a second voltage applied using at least one of the fourth electrode, the fifth electrode, or the sixth electrode. The second display element further includes a second wall surrounding the fourth subpixel area, the fifth subpixel area, and the sixth subpixel area. The second wall includes a fourth wall portion adjacent to the fourth subpixel area and the fifth display area, a fifth wall portion adjacent to the fifth subpixel area and the sixth subpixel area, and a sixth wall portion adjacent to the sixth subpixel area and the fourth subpixel area. The second wall further contains a fourth further wall portion connecting the fourth wall portion to the fifth wall portion, a fifth further wall portion connecting the fourth wall portion to the fifth wall portion, and a sixth further wall portion connecting the fifth wall portion to the sixth wall portion. Each of the fourth wall portion, the fifth wall portion, the sixth wall portion, the fourth further wall portion, the fifth further wall portion, the sixth further wall portion are substantially straight and the second wall is operable to retain the third fluid within the second electrowetting element, and the first wall portion adjacent to the fifth wall portion.

In examples of array 540, the first color effect may be substantially the same as the fourth color effect, the second color effect is substantially the same as the fifth color effect, and the third color effect is substantially the same as the sixth color effect. This may provide a maximum horizontal and vertical luminance resolution.

In further examples, array 540 may include a first white filter positioned between the first filter, the second filter, and the third filter, and a second white filter positioned between the fourth filter, the fifth filter, and the sixth filter, the first and second white filters providing a white effect.

Numerous examples of an electrowetting element and of arrays of such electrowetting elements are described above.

Figure 31:
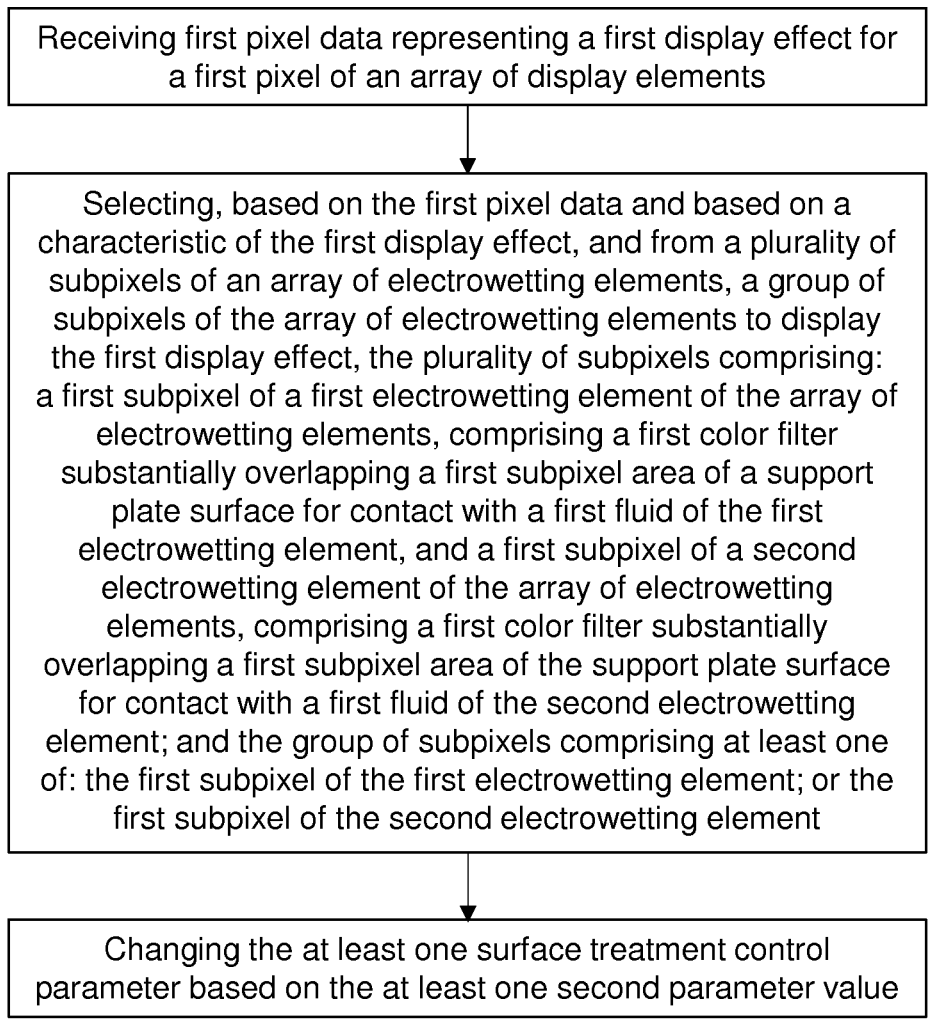
FIG. 31 is a flow diagram showing examples of a method of control.

Examples of a method of controlling an array of electrowetting elements will now be described, with respect also to FIG. 31. It is to be appreciated that such examples may be applied to any of the arrays of electrowetting elements described above. However, for the sake of explanation, the array of FIG. 10 will be referred to in the following example now to be described. Features described previously in relation to FIG. 10 should be taken to apply here also, with common features having corresponding descriptions taken to apply here also.

As explained earlier, the extent of a subpixel area in an electrowetting element that is adjoined by a first fluid, for example an oil or alkane, is controllable in dependence on a voltage applied between the electrode substantially overlapping the subpixel area in question and the electrode in contact with the second fluid.

In known systems, a pixel may have a fixed combination of sub-pixels. In other words, for displaying different display effects, for example of a particular hue and luminance, the same sub-pixels are used each time for that pixel. Thus, the construction of a pixel is fixed.

It has now been found that with for example electrowetting elements in accordance with examples described herein, and arrays of such electrowetting elements also described herein, new methods of controlling the configuration of the fluids in each electrowetting element may be used to give improved display effects compared with known systems.

Figure 23:
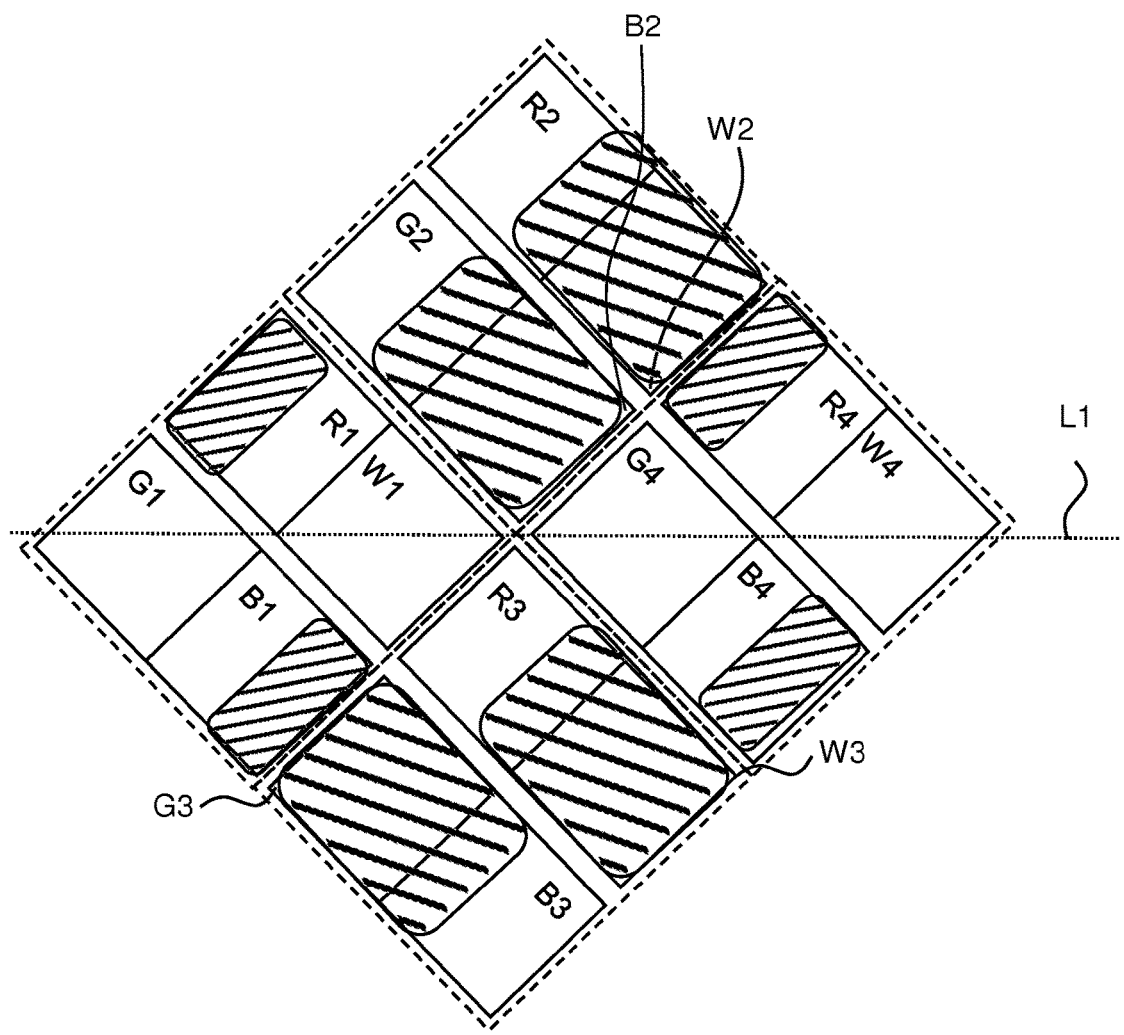
FIGS. 23, 24, 25, 26, 27, 28, 29, and 30 are plan views showing example electrowetting elements with various configurations of fluids.

Referring now to FIG. 23 there is shown an array of electrowetting elements in accordance with that described previously using FIG. 10. In FIG. 23, the first fluid in each electrowetting element is configured, using at least one applied voltage of appropriate magnitude, to adjoin a certain extent of the subpixel area.

The extent of each subpixel area of each electrowetting element is dependent on the display effect to be displayed, which is controlled for example as now explained.

Using for example a control system described below, which for example includes the at least one processor and the at least one memory, with appropriate computer program instructions, first pixel data may be received. The first pixel data represents a first display effect for a display unit, for example a pixel, of an array of display elements. The first pixel data may therefore in some examples be standard input data for example according to the sRGB format which is well known by the skilled person. Such input data may not be device specific, in that the data for example indicates for a given point in space a hue and a luminance value for displaying. Such data may therefore be input to other non-electrowetting type display devices.

Then, for example, the control system may select which of a plurality of subpixel areas of the electrowetting elements of the array to use for displaying a given display effect represented by the received first pixel data. Looking at the array of electrowetting elements shown for example by FIG. 23, there is a plurality of subpixel areas, for example each subpixel area indicated in this example with R, G, B or W, corresponding respectively to a red, green, blue or white hue attributed with that subpixel area, for example due to the association with a color filter for filtering light of the appropriate wavelength(s) to effectuate a particular color effect as explained previously.

The plurality of subpixel areas comprises a first subpixel area of a first electrowetting element of the array which substantially overlaps a first electrowetting element first filter configured to effectuate a first color effect. The plurality of subpixel areas also comprises a first subpixel area of a second electrowetting element of the array which substantially overlaps a second electrowetting element first filter configured to effectuate the first color effect. Therefore, the first subpixel area of the first and second electrowetting elements correspond with for example the same hue, despite being in different electrowetting elements. In examples, such first subpixel areas of two different electrowetting elements are located in two electrowetting elements which are adjacent to each other. Adjacent in some examples is where there is no further electrowetting element between the two electrowetting elements in question. In other examples, the two electrowetting elements may be separated from each other by at least one further electrowetting element.

An example is given with reference to FIG. 23, for explanation purposes. In FIG. 23, there is a first set of subpixel areas corresponding with an R, G, B and W hue respectively; each of those subpixel areas is labelled in FIG. 23 with the appropriate R, G, B or W label with the suffix "1". Similarly, a second set of subpixel areas corresponding with an R, G, B or W hue is labelled with the appropriate R, G, B or W label with the suffix "2". The subpixel areas G1 and G2 may each be taken as a first subpixel area of a different electrowetting element which substantially overlap a first filter of the first or second electrowetting element, respectively, for effectuating a color effect of for example the same hue. For completeness, third and fourth sets of subpixel areas are similarly labelled using respectively the suffixes "3" and "4".

Depending on the display effect to be displayed, a group of the subpixel areas of the plurality of subpixel areas is selected for displaying the display effect in question. The group of subpixel areas comprises at least one of: the first subpixel area of the first electrowetting element, or the first subpixel area of the second electrowetting element. Therefore, in some examples, for the first pixel data for a first display unit (for example a pixel), one or both of the first subpixel area of each of the first and second electrowetting elements may be selected.

Typically a group of subpixel areas which is selected is for example a sub-set of subpixel areas selected from a set of subpixel areas which together are the plurality of subpixel areas. Each subpixel area of the group of subpixel areas may not necessarily be adjacent each other; nor may the first subpixel area of the first electrowetting element be adjacent to the first subpixel area of the second electrowetting element.

Figure 24:
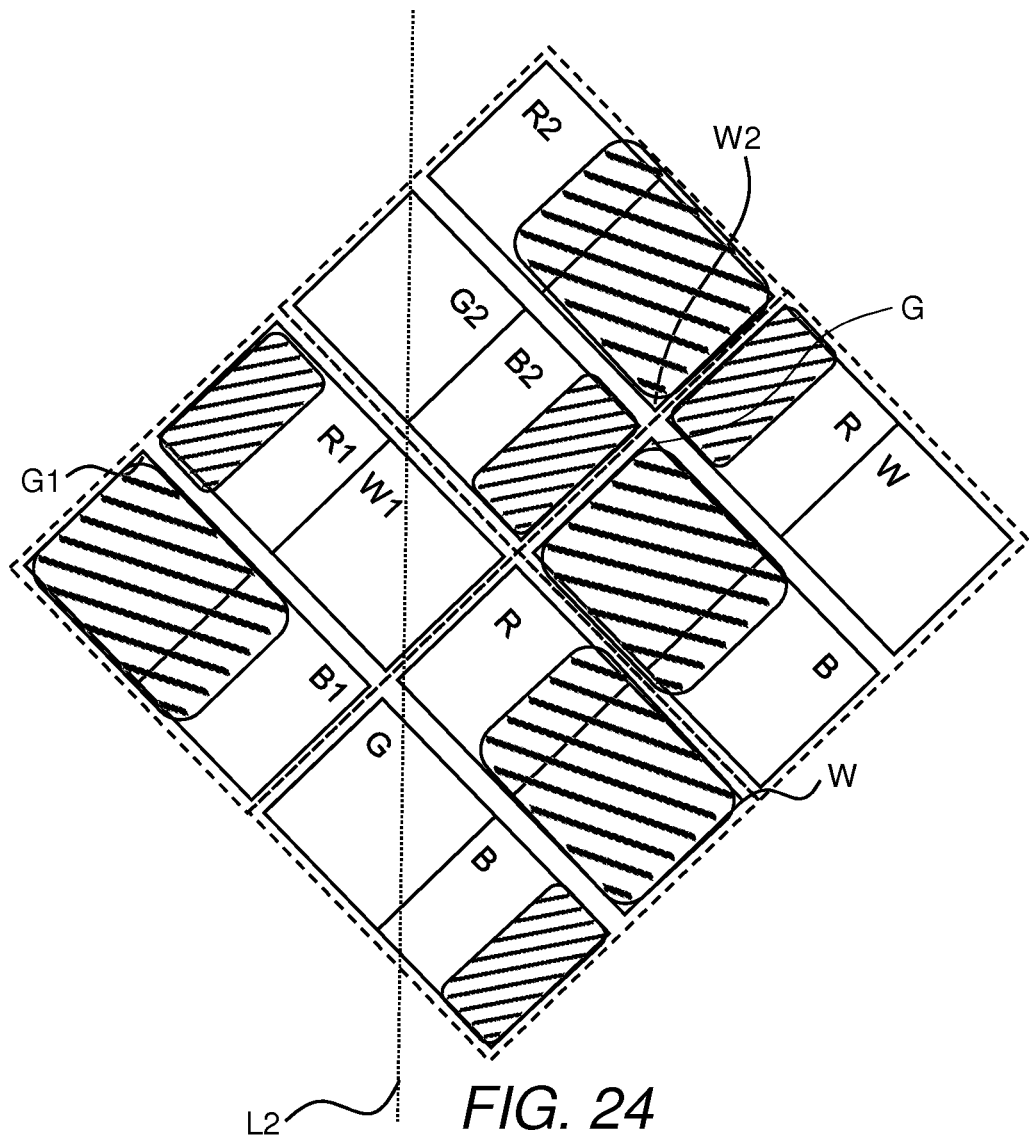

Referring now to FIGS. 23 and 24, selecting of one of the first subpixel areas of the first and second electrowetting elements, in dependence on the display effect to be displayed, is illustrated.

FIG. 23 illustrates a configuration of first fluids in several electrowetting elements. The subpixel areas are labelled with the appropriate R, G, B or W label, with the suffix "1" or "2" where appropriate. The extent of each subpixel areas adjoined, for example covered, by the first fluid depends on the display effect and is controlled by the voltage applied in each electrowetting element using the electrodes. The extent of first fluid coverage of each subpixel area is indicated in FIGS. 23 and 24 using diagonally hatched shading. Therefore an extent of each subpixel area which is not covered, for example uncovered, by first fluid is shown as an extent of a subpixel area which does not have diagonally hatched shading over it.

In FIG. 23 a first display effect is illustrated. In this example the first display effect represents a display effect feature which is longitudinal in shape along a longitudinal axis L1, with the characteristic being an orientation of the longitudinal axis, which in this example is a horizontal axis as shown. To display this display effect the first fluid of each electrowetting element of the array of electrowetting elements is configured to uncover at least part of the following subpixel areas: G1, B1, R1, W1, B2, R3, G4, R4, B4 and W4. Therefore, at least part of the following subpixel areas may therefore be adjoined, for example covered, by the first fluid: R1, G2, R4, W2, R2, B4, W3, B1, G3 and R3. Further details of examples of such linear features will be described below.

In contrast to FIG. 23, FIG. 24 illustrates a different first display effect which is also a linear feature but with a longitudinal axis L2 substantially perpendicular to the longitudinal axis L1. Therefore as illustrated the second longitudinal axis L2 is a vertical axis. As can be seen, different extents of subpixel areas are covered by the first fluid and different extents of subpixel areas are uncovered by the first fluid, to display the different first display effect.

For example, for the linear display effect feature with axis L1, subpixel area G1 is uncovered, for example not adjoined by the first fluid, whereas for the different linear display effect feature with axis L2, subpixel area G1 is covered by the first fluid. Instead, for the linear display effect feature with axis L1, subpixel area G2 is covered, and subpixel area G2 is uncovered by the first fluid. In this way, a different subpixel area corresponding to a particular color effect, for example a hue, in this case a green hue, is selected in dependence on the first display effect to be displayed, for example an orientation of the longitudinal axis. Hence, depending on the first display effect, either the first subpixel area of the first electrowetting element may be selected for the group of subpixel areas, or the first subpixel area of the second electrowetting element may be selected for the group of subpixel areas.

The example given here with respect to subpixel areas G1 and G2 is one example of a selection between two different subpixel areas for displaying a certain display effect. For a certain display effect, in examples of the method, further subpixel areas may be selected in preference over a different subpixel area.

Once the group of subpixel areas has been selected, the control system may then output control data for switching the first fluid of each electrowetting element appropriately to obtain the extent of coverage and/or non-coverage of each subpixel area required to display the display effect. The outputting control data comprises for example selectively outputting: control data based on a first orientation of the longitudinal axis, using the first subpixel of the first electrowetting element; or control data based on a second orientation of the longitudinal axis, using the first subpixel of the second electrowetting element. Therefore the output control data is for displaying the first display effect using the first group of subpixel areas. The outputted control data may for example be signals corresponding to voltage levels for each electrode overlapping a subpixel area of the group of subpixel areas selected for displaying the display effect, so that a voltage of appropriate magnitude is applied to each subpixel area for obtaining the desired first fluid coverage of each subpixel area.

As explained above, depending on the display effect to be displayed, one or a different subpixel area may be selected as the group of subpixel areas. However, in relation to other subpixel areas in the array, the same subpixel area may be used for at least two different display effects. In other words the different display effects may have in common the same subpixel area. An example of this is illustrated using FIGS. 23 and 24 where the subpixel area B1 is at least partly uncovered of any first fluid for both the display effect of FIG. 23 and for the display effect of FIG. 24. Thus, in examples, with the first display effect representing a linear display effect feature, which is longitudinal along a longitudinal axis, with a first orientation (for example corresponding with axis L1) the group of subpixel areas selected comprises the first subpixel area of the first electrowetting element, and with the first display effect representing a linear display effect feature instead with a second orientation (for example corresponding with axis L2) the group of subpixel areas selected also comprises the first subpixel areas of the first electrowetting element. It is to be appreciated that the same subpixel area of other electrowetting elements may also be used for different display effects; for example the subpixel area W1 may be uncovered by first fluid for both the linear display effect of the first orientation (see FIG. 23 for example) and for the linear display effect of the second orientation (see FIG. 24 for example). Thus, for example, irrespective of an orientation of a linear display effect feature, the group of subpixel areas of the array may comprise a second subpixel area (different from the first subpixel areas referred to in earlier paragraphs in relation to FIGS. 23 and 24) of an electrowetting element of the array which second subpixel area substantially overlaps a second filter configured to effectuate a second color effect.

It is to be appreciated that, compared with a known system with a pixel having certain sub-pixels regardless of the display effect to be displayed, the method of controlling display of a display effect using examples of an array of electrowetting elements described herein may not be considered to use certain sub-pixels (which correspond with respective subpixel areas) for any display effect. Instead, by selecting certain subpixel areas to use in dependence on a display effect, for example based on a characteristic of the first display effect, the sub-pixels of a pixel (which may otherwise be referred to as a display unit) may be considered dynamically chosen in dependence on the display effect. Therefore, without any fixed construction of a pixel in the array, the sub-pixels and therefore a display unit may be considered flexible or virtual, as it can be changed based on the selection for the display effect in question. As will now be explained, this can offer benefits for improving the quality of a display effect, including for example any of: a brightness resolution of a linear display effect (for example horizontally and/or vertically, but also diagonally), a definition of a display effect for example a smoothness of an edge of a display effect, for example of text characters.

As the display effect is used to select which subpixel areas may be selected as the group of subpixel areas, and in dependence on the particular construction of electrowetting elements in the array, it is possible to display a first display effect with a minimum dimension which is less than a length of a respective display region of at least one electrowetting element of the array of electrowetting elements. These electrowetting elements may comprise at least two adjacent subpixel areas. In this way, the definition of a display effect feature is not limited to the resolution of a display unit, which is related to the size of the display region for an electrowetting element. Instead, different subpixel areas of different, for example adjacent, electrowetting elements may be selected for a given display effect, meaning that a display effect feature may have a minimum dimension less than the maximum dimension (such as a length) of the display region. Indeed, the minimum dimension of a display effect feature may not even be limited to the maximum dimension (for example a length) of a subpixel area, as with the ability to control the extent of each subpixel area covered or uncovered by the first fluid, a relatively light or relatively dark display effect feature (explained further below) may have a minimum dimension less than the maximum dimension (for example a length) and in some examples also a minimum dimension (for example a width), of the subpixel area, as it is the position of the edge of the meniscus of the first fluid in contact with the surface of the subpixel area which for example determines the extent of the subpixel area covered by the first fluid and therefore the definition of a display effect feature.

This greater definition allows display effects to be more precisely displayed and is for example therefore useful for presenting text content, for example individual text characters, precisely and with smooth edges whether curved or linear. Improved display of text is useful for e-readers for example, such that a user of an e-reader device with electrowetting elements of examples described herein is presented with higher quality images of text, which improve the user experience and for example reduce fatigue to a user when viewing text.

It is to be appreciated that a display effect to be presented may be formed of a combination of at least one extent of a subpixel area which is covered by a first fluid, and at least one extent of a subpixel area which is uncovered by a first fluid. Therefore, it is the edges between covered and uncovered parts of the subpixel areas and therefore a resulting contrast in the display effect which aid formation of a display effect. With this in mind, a display effect feature, for example a component of a display effect, which component may for example be a linear display effect feature such as a stripe, may correspond with a relatively light display effect feature or a relatively dark display effect feature. In such examples a shape of the first display effect may be a characteristic of the first display effect and the selecting the group of subpixels may be based on the shape. Depending on whether the input display effect data indicates a relatively dark or light display effect feature, will influence whether the group of subpixel areas is selected for being at least partly uncovered by the first fluid or at least partly covered by the first fluid. Therefore, the outputted control data may be indicative of a respective fluid coverage extent (of the first fluid) for each subpixel area of the group selected on the basis of the display effect. Further, or in other examples, the outputted control data may be indicative of a respective fluid non-coverage extent (of the first fluid) for each subpixel area of the group selected on the basis of the display effect.

Typically, the phrase relatively dark display effect feature is for example a display effect feature which is dark relative to an uncovered part of a subpixel area. Therefore, a relatively dark display effect feature may in examples correspond with a display effect feature created by and corresponding with at least part of a subpixel area covered by the first fluid. Therefore, in examples, a relatively dark display effect feature may not be a dark color such as black, or another color with a low luminance, but may for example be a color which is darker than an uncovered part of a subpixel area.

Similarly, typically, the phrase relatively light display effect feature is for example a display effect feature which is light relative to a covered part of a subpixel area. Therefore, a relatively light display effect feature may in examples correspond with a display effect feature created by and corresponding with at least part of a subpixel area uncovered by the first fluid. Therefore, in examples, a relatively light display effect feature may not be a light color such as white, or another color with a high luminance, but may for example be a color which is lighter than a covered part of a subpixel area.

In some examples, the relatively dark display effect feature and the group of subpixel areas selected comprises at least two adjacent subpixel areas, with the output control data comprising control data indicative of a fluid coverage extent of each of the at least two adjacent subpixel areas. For example, the fluid coverage extent for each of the at least two adjacent subpixel areas is substantially equal to (for example within acceptable coverage tolerances) a respective extent of each of the at least two adjacent subpixel areas. In this way, with the subpixel areas being adjacent each other, a dark display feature may be created which spans multiple subpixel areas. In other words, the first fluid covering the subpixel area of multiple adjacent subpixel areas together form a cluster of covered subpixel areas which form a relatively dark display effect feature. Thus, subpixels may be selected which together form the shape of the relatively dark or relatively light display effect feature.

Such a feature may for example be a relatively dark stripe where for example the first fluid of each electrowetting element is a relatively dark colored first fluid. A stripe is for example a band or other linear feature having an approximately uniform thickness along a longitudinal axis.

Such a stripe display effect feature may be useful in displaying text using the array. For example, text characters require stripes of other linear features to form the text characters. Further, if a curved edge is desired for a relatively dark display effect feature, the edge of the first fluid of at least one electrowetting element may be controlled to form a non-linear edge of a suitable shape to display the feature required. The ability to control the first fluid edge for each electrowetting element gives considerable granularity of control for displaying a display effect feature, and hence a greater definition for displaying display effects.

A similar explanation applies to a relatively light display effect feature, with the group subpixel areas selected comprising at least two adjacent subpixel areas for being uncovered by the first fluid in respective electrowetting elements, to form a cluster of multiple uncovered part extents and/or entire uncovered extents of subpixel areas adjacent to each other to form a relatively light display effect feature.

Such a display effect may be a stripe display effect feature and may for example be seen in FIG. 23, with the linear display effect along axis L1 being considered a stripe. Note that although this stripe does not have straight sides parallel along the length of the stripe to the axis L1, this feature may still be considered to be a stripe on the basis that it is a stripe within the limits of the positioning of the first fluid edges for each electrowetting element, in dependence on the particular construction of the electrowetting elements and their positioning relative to each other in the array. Indeed, for a viewer of the array, any irregularities in a straight side of a stripe, parallel to the longitudinal axis L1, will at an appropriate distance of viewing the array merge to appear as a straighter sided stripe. A similar description applies to the stripe shown in FIG. 24 with a different axis L2. Such a relatively light feature such as a stripe may be useful for displaying text to a viewer, for example to provide clear and bright stripes or bands between lines of text, to give for example suitable contrast to more clearly display the text to the viewer. Also, relatively light areas between parts of text characters or between text characters themselves are also required to display text, and therefore also their shape and brightness contribute to the quality of the displayed text.

As will be appreciated, the color effects corresponding to different subpixel areas of an array of electrowetting elements may be chosen in dependence on the particular array of electrowetting elements to be manufactured. Further, depending on the color gamut for display effects to be displayed, the choice of color effects and therefore color filter hues may be selected accordingly.

In the examples of FIGS. 23 and 24, the stripe display effects illustrated correspond with subpixel areas corresponding with green and white display effects, which as explained earlier, due to the adjacency of these subpixel areas along a longitudinal axis, give a brighter stripe than using other combinations of color effects. Hence, a vertical and/or horizontal brightness resolution may be improved compared with known systems by using the control method described in examples here with the appropriate electrowetting element construction and array layout of those electrowetting elements.

Figure 25:
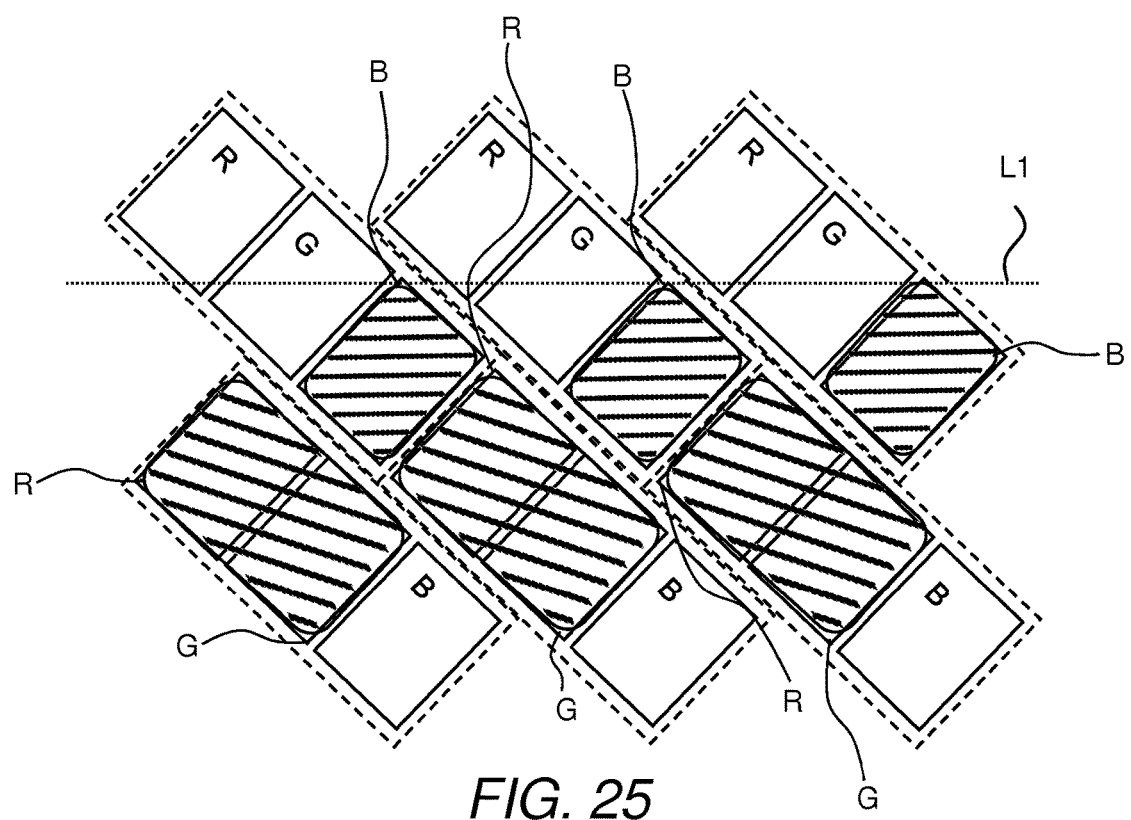
Figure 26:
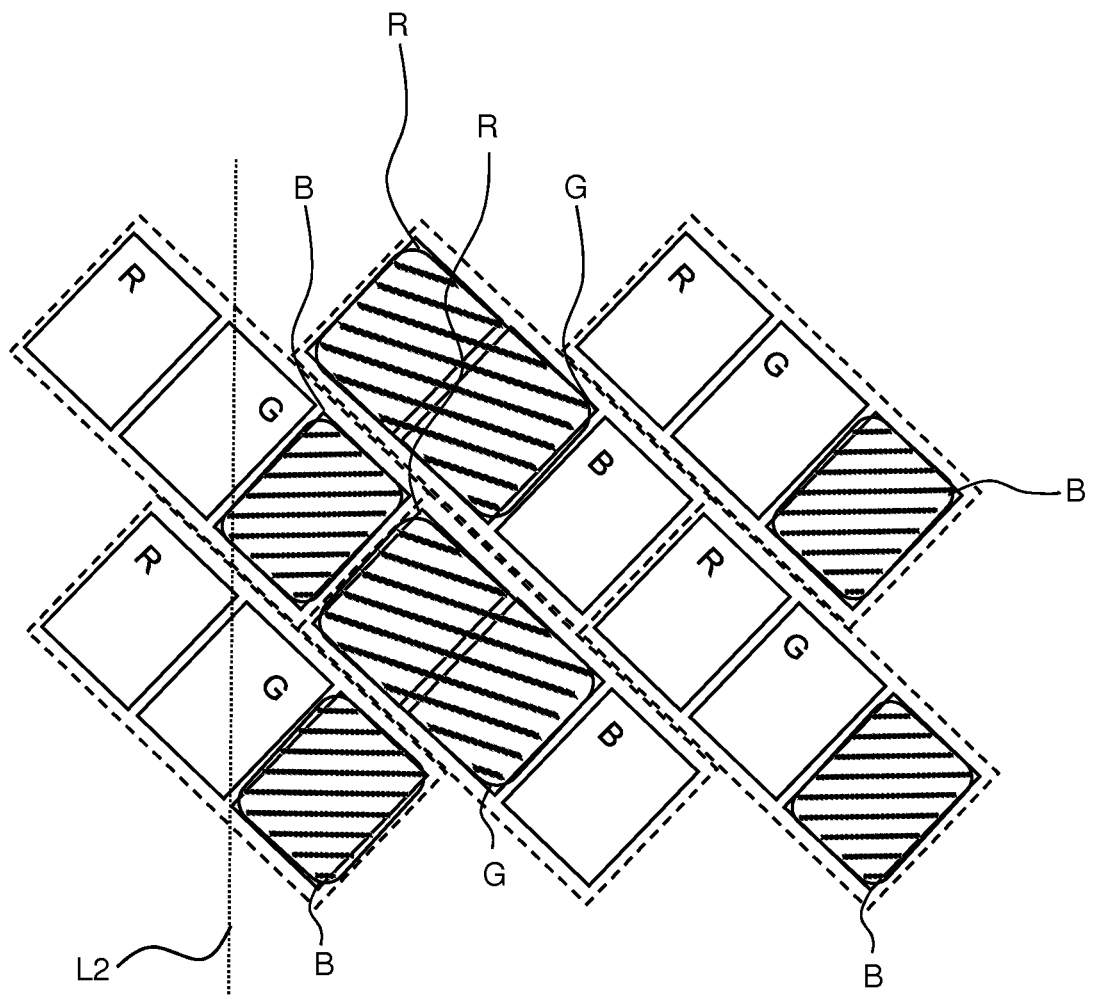

In some examples, such as that of FIGS. 25 and 26, an array of electrowetting elements comprises a first electrowetting element with a first subpixel area substantially overlapping a first filter configured to effectuate a first color effect, a second subpixel area substantially overlapping a second filter configured to effectuate a second color effect, and a third color filter substantially overlapping a third filter configured to effectuate a third color effect. The array further comprises a second electrowetting element also with a first subpixel area substantially overlapping a first filter configured to effectuate the first color effect, a second subpixel area substantially overlapping a second filter configured to effectuate the second color effect, and a third color filter substantially overlapping a third filter configured to effectuate the third color effect. In some examples the first, second and third color effects is a different one of a red hue, a green hue or a blue hue, Therefore, an electrowetting element has red, green and blue (RGB) color effect capabilities, for forming for example full color display effects. The electrowetting element may further include a subpixel area corresponding for example with a white (W) display effect. Therefore in some examples an electrowetting element may be considered to be an RGBW electrowetting element.

Further examples of how the first fluid of different electrowetting elements may be controlled to display different display effects by selecting the subpixel areas of a group of subpixels will now be illustrated using FIGS. 23 to 30. In many of these examples, a relatively light and/or relatively dark display effect such as a stripe is shown. It is however to be appreciated that other display effects, for example non-linear, are envisaged using the arrays of electrowetting elements described herein. Indeed, the method of selecting the group of subpixel areas may be based on at least one of: a shape of a display effect (such as the first display effect represented by the first pixel data), a linearity of the display effect, a minimum dimension of the display effect, a maximum dimension of the display effect or a color of the display effect (for example the characteristic of the first display effect is a predetermined color and the selecting the group of subpixels selects subpixels which together substantially form the predetermined color; the color may be white and in which case an approximately equal number of at least one red hue subpixel, at least one green hue subpixel and at least one blue hue subpixel may be selected). In such examples, the method may comprise analysing the first pixel data to determine the at least one characteristic of the first display effect; analysing the first pixel data to determine at least one characteristic of the first display effect; and spatially mapping the first display effect on to the plurality of subpixels of the array of electrowetting elements. The selecting the group of subpixels of the array of electrowetting elements may comprise selecting subpixels of the array of electrowetting elements spatially mapped to the first display effect.

With the increased definition available for displaying a display effect as explained above, the selecting of the group of subpixel areas may therefore be based on mapping a color effect at each point of location for input display effect data with a location of each subpixel area of the electrowetting elements, rather than in known systems mapping such a color effect with the location of each pixel of an array of display elements. Hence, a more granular approach may be applied for more precisely and with more definition displaying a display effect. Further, for a given color of a display effect, several subpixel areas corresponding with the same color effect may be selected from, which are generally around the point of location required for that display effect, in order to select the subpixel area which will offer the same color effect and an appropriate position in the array for more precisely displaying the display effect.

Referring to FIGS. 25 and 26, an array of electrowetting elements is illustrated similar to that described above with reference to FIG. 12. Such electrowetting elements are each rectangular in this example and include three subpixel areas corresponding with R, G and B color effects respectively, with a white filter between adjacent of the subpixel areas corresponding with the R, G and B display effects, as described previously with reference to FIG. 12. A linear display effect is shown in each of FIGS. 25 and 26, corresponding with those having axes labelled L1 and L2 described earlier; a corresponding description should be taken to apply here also.

Figure 27:
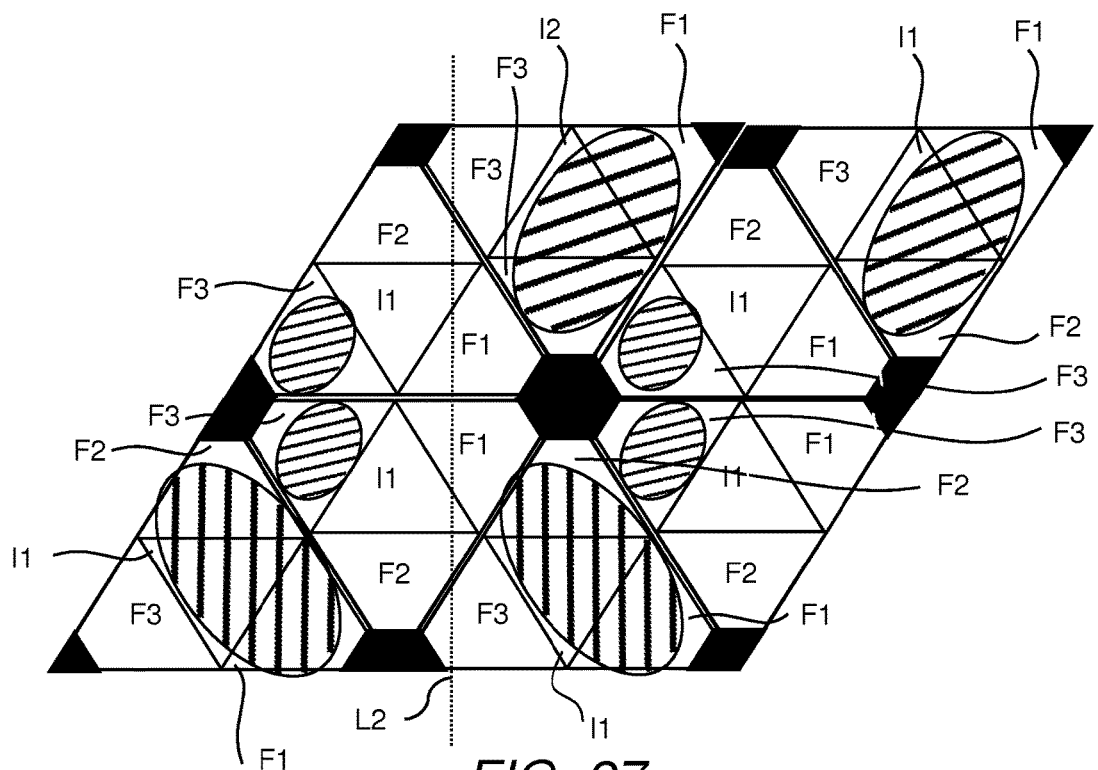
Figure 28:
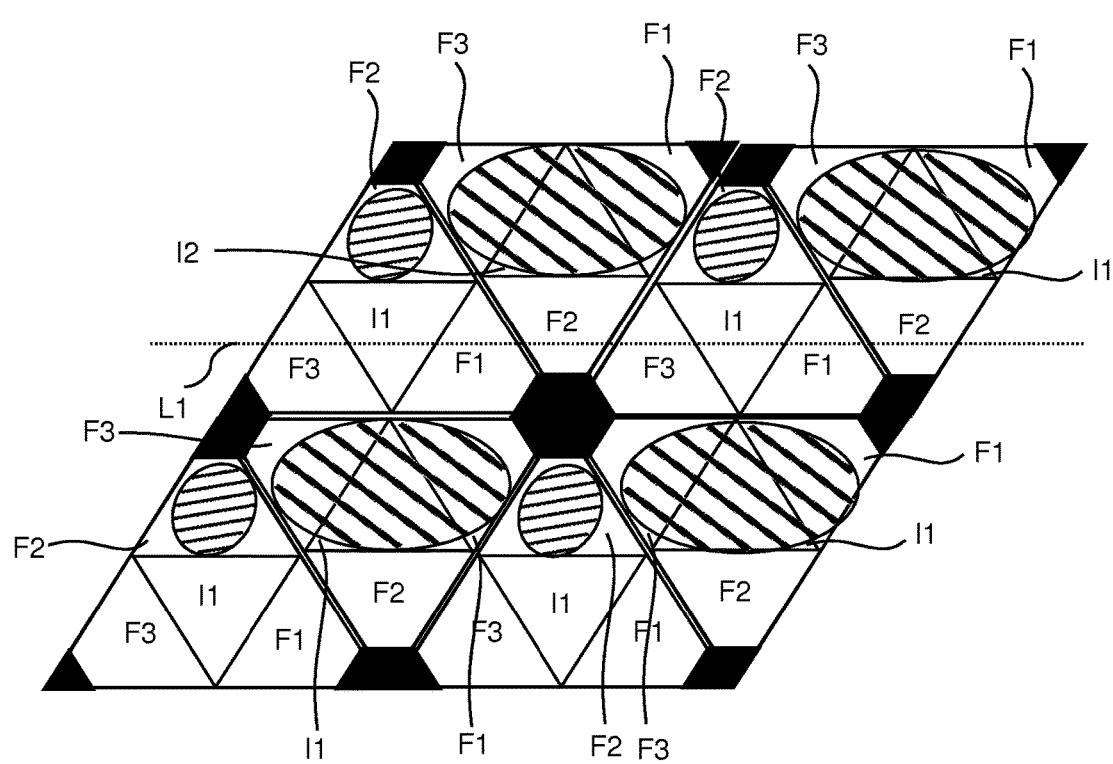

Referring to FIG. 27 and FIG. 28, an array of electrowetting elements is illustrated similar to that described above with reference to FIG. 21. Such electrowetting elements are each triangular in this example. A linear display effect is shown in each of FIGS. 27 and 28, corresponding with those having axes labelled L1 and L2 described earlier; a corresponding description should be taken to apply here also.

Figure 29:
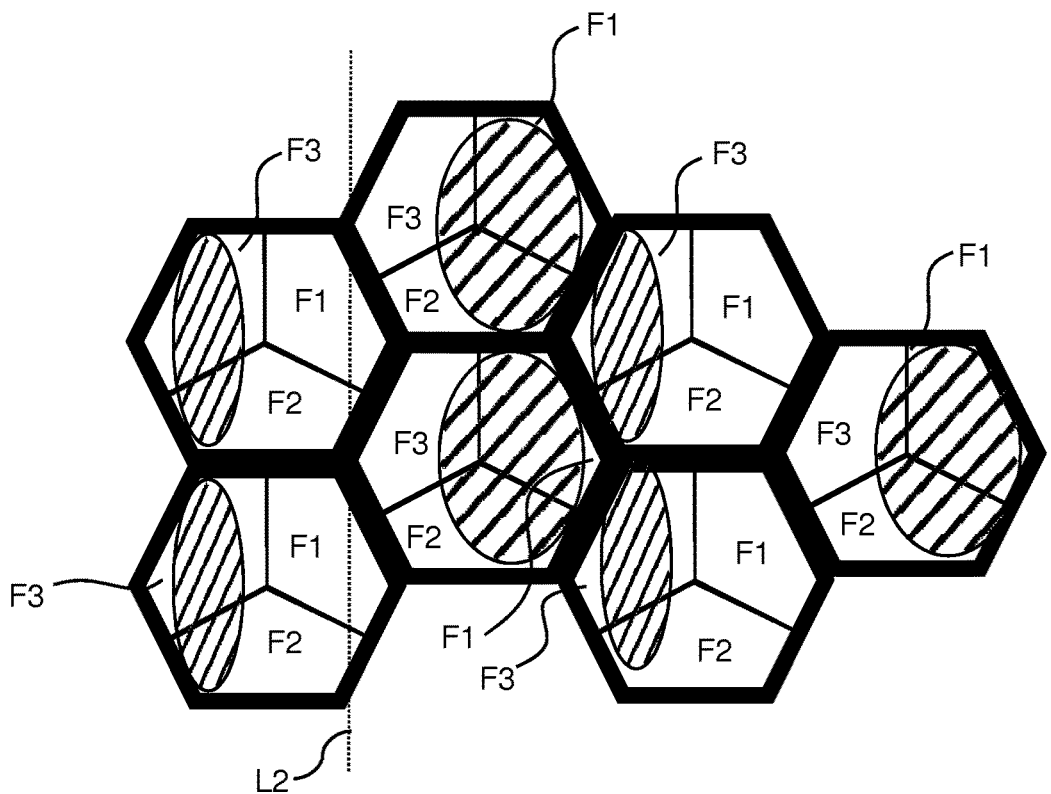
Figure 30:
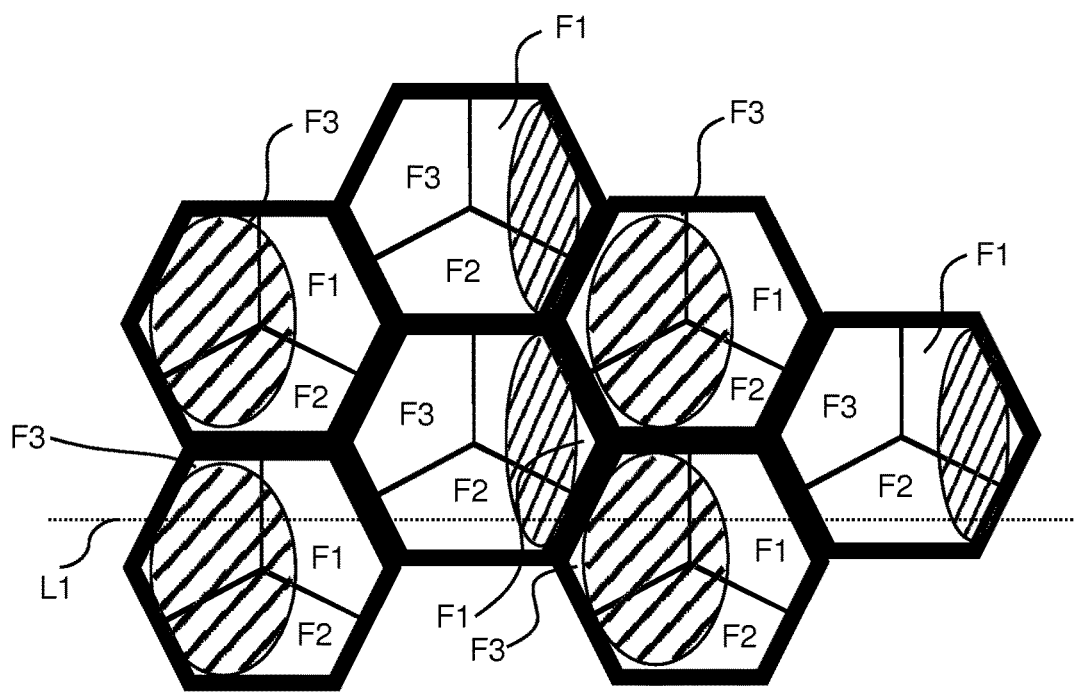

Referring to FIG. 29 and FIG. 30, an array of electrowetting elements is illustrated similar to that described above with reference to FIG. 22. Such electrowetting elements are each hexagonal in this example. A linear display effect is shown in each of FIGS. 29 and 30, corresponding with those having axes labelled L1 and L2 described earlier; a corresponding description should be taken to apply here also.

It is to be appreciated that FIGS. 23 to 30 are examples of other array implementations which may be used for the control method described herein. Other arrays described herein may also be used, as the skilled person will appreciate.

The above examples are to be understood as illustrative examples. Further examples are envisaged.

Figure 32:
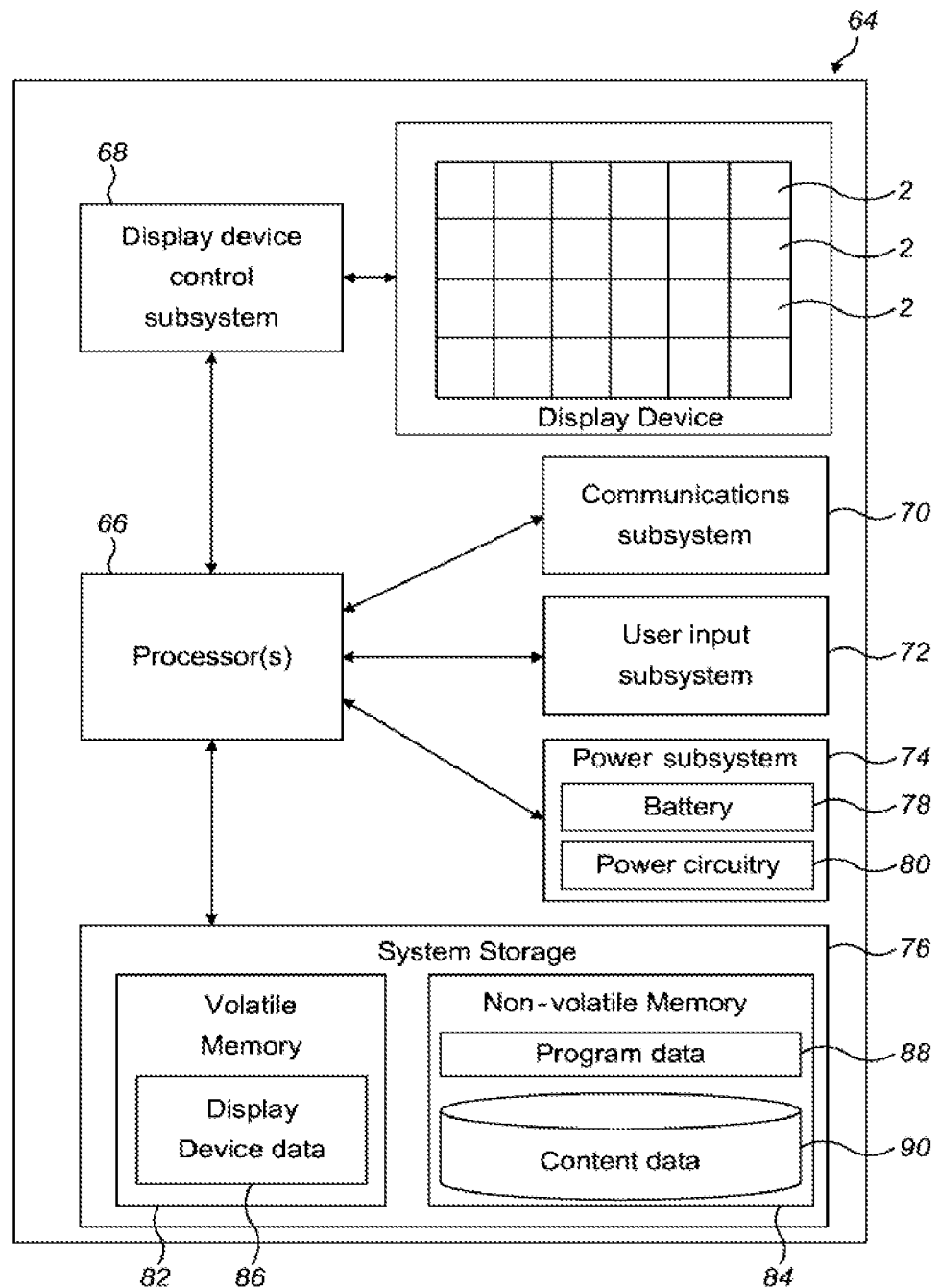
FIG. 32 schematically shows an example electrowetting display apparatus.

FIG. 32 shows schematically a system diagram of an example system, for example apparatus 64, comprising an electrowetting display element, electrowetting display unit, array of electrowetting display elements, or array of electrowetting display units such as any of the examples described above. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 64. The apparatus includes at least one processor 66 connected to and therefore in data communication with for example: a display device control subsystem 68, a communications subsystem 70, a user input subsystem 72, a power subsystem 74 and system storage 76. The display device control subsystem is connected to and is therefore in data communication with the display device. The at least one processor 66 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 76. The at least one processor may additionally, or in the alternative, contain memory, such as processor registers.

The display device control subsystem 68 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device via circuitry to control the electrowetting display elements. The circuitry may include signal and control lines such as those described above.

The communications subsystem 70 for example is configured for the apparatus to communicate with for example a computing device via a data network, for example a computer network such as the Internet, a local area network, a wide area network, a telecommunications network, a wired network, a wireless network, or some other type of network. The communications subsystem 70 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 72 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 74 for example includes power circuitry 80 for use in transferring and controlling power consumed by the apparatus. The power may be provided by a mains electricity supply or from a battery 78, via the power circuitry. The power circuitry may further be used for charging the battery from a mains electricity supply.

The system storage 76 includes at least one memory, for example at least one of volatile memory 82 and non-volatile memory 84 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 32, the volatile memory 82 stores for example display device data 86 which is indicative of display effects to be provided by the display device. The processor 66 may transmit data, based on the display device data, to the display device control subsystem 68 which in turn outputs signals to the display device for applying voltages to the display elements, for providing display effects from the display device. The non-volatile memory 84 stores for example program data 88 and/or content data 90. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting pixel, comprising:
a support plate having a surface;
a first electrowetting element comprising:
    a first subpixel comprising:
        a first color filter substantially overlapping a first subpixel area of the surface; and
        a first electrode;
    a second subpixel comprising:
        a second color filter substantially overlapping a second subpixel area of the surface; and
        a second electrode;
    a first fluid configurable to adjoin at least one of the first subpixel area or the second subpixel area, in dependence on at least a first voltage applied using at least one of the first electrode or the second electrode; and
    a second fluid immiscible with the first fluid; and
a second electrowetting element adjoining the first electrowetting element, the second electrowetting element comprising:
    a third subpixel comprising:
        a third color filter substantially overlapping a third subpixel area of the surface; and
        a third electrode;
    a fourth subpixel comprising:
        a fourth color filter substantially overlapping a fourth subpixel area of the surface; and
        a fourth electrode;
    a third fluid configurable to adjoin at least one of the third subpixel area or the fourth subpixel area, in dependence on at least a second voltage applied using at least one of the third electrode or the fourth electrode; and
    a fourth fluid immiscible with the third fluid.

2. The electrowetting pixel of claim 1, wherein
the first color filter is a red hue filter,
the second color filter is a blue hue filter,
the third color filter is a green hue filter, and
the fourth color filter is a white filter.

3. The electrowetting pixel of claim 1, wherein
the first color filter is a green hue filter,
the second color filter is a blue hue filter,
the third color filter is a red hue filter, and
the fourth color filter is a white filter.

4. The electrowetting pixel of claim 1, wherein at least one of the first color filter or the second color filter is a red hue filter, and at least one of the third color filter or the fourth color filter is a green hue filter.

5. The electrowetting pixel of claim 1, wherein at least one of the first color filter or the second color filter is a blue color filter, and at least one of the third color filter or the fourth color filter is a white filter.

6. The electrowetting pixel of claim 1, wherein the first fluid is configurable to adjoin substantially one of the first subpixel area or the second subpixel area without adjoining the second subpixel area or the first subpixel area, respectively.

7. The electrowetting pixel of claim 1, wherein the third fluid is configurable to adjoin substantially one of the third subpixel area or the fourth subpixel area without adjoining the fourth subpixel area or the third subpixel area, respectively.

8. The electrowetting pixel of claim 1, further comprising a wall on the surface of the support plate, positioned between the first subpixel area and the third subpixel area, and positioned between the second subpixel area and the fourth subpixel area.

9. The electrowetting pixel of claim 1, wherein at least one of the first color filter or the second color filter extends to a first edge of the first electrowetting element, and at least one of the third color filter or the fourth color filter extends to a first edge of the second electrowetting element.

10. An array of electrowetting pixels comprising:
a support plate having a surface;
a first pixel comprising:
    a first electrowetting element comprising:
        a first subpixel comprising:
            a first color filter substantially overlapping a first subpixel area of the surface; and
            a first electrode;
        a second subpixel comprising:
            a second color filter substantially overlapping a second subpixel area of the surface; and
            a second electrode;
        a first fluid configurable to adjoin at least one of the first subpixel area or the second subpixel area, in dependence on at least a first voltage applied using at least one of the first electrode or the second electrode; and
        a second fluid immiscible with the first fluid; and
    a second electrowetting element adjoining the first electrowetting element the second electrowetting element comprising:
        a third subpixel comprising:
            a third color filter substantially overlapping a third subpixel area of the surface; and
            a third electrode;
        a fourth subpixel comprising:
            a fourth color filter substantially overlapping a fourth subpixel area of the surface; and
            a fourth electrode;
        a third fluid configurable to adjoin at least one of the third subpixel area or the fourth subpixel area, in dependence on at least a second voltage applied using at least one of the third electrode or the fourth electrode; and
        a fourth fluid immiscible with the third fluid; and a second pixel comprising:
  a third electrowetting element comprising:
    a fifth subpixel comprising:
      a fifth color filter substantially overlapping a fifth subpixel area of the surface; and
      a fifth electrode;
    a sixth subpixel comprising:
      a sixth color filter substantially overlapping a sixth subpixel area of the surface; and
      a sixth electrode;
    a fifth fluid configurable to adjoin at least one of the fifth subpixel area or the sixth subpixel area, in dependence on at least a third voltage applied using at least one of the fifth electrode or the sixth electrode;
    a sixth fluid immiscible with the fifth fluid; and
  a fourth electrowetting element adjoining the third electrowetting element, the fourth electrowetting element comprising:
    a seventh subpixel comprising:
      a seventh color filter substantially overlapping a seventh subpixel area of the surface; and
      a seventh electrode;
    an eighth subpixel comprising:
      an eighth color filter substantially overlapping an eighth subpixel area of the surface; and
      an eighth electrode;
    a seventh fluid configurable to adjoin at least one of the seventh subpixel area or the eighth subpixel area, in dependence on at least a fourth voltage applied using at least one of the seventh electrode or the eighth electrode; and
    an eighth fluid immiscible with the seventh fluid.

11. The array of claim 10, wherein the first pixel is in a first array column and the second pixel is in a second array column adjacent to the first array column, and the fourth subpixel area is adjacent to the seventh subpixel area.

12. The array of claim 10, wherein the first pixel is in a first array column and the second pixel is in a second array column adjacent to the first array column, and the fourth subpixel area is adjacent to the fifth subpixel area.

13. The array of claim 10, wherein the first color filter is for substantially the same hue as the fifth color filter, the second color filter is for substantially the same hue as the sixth color filter, and the third color filter is for substantially the same as the seventh color filter.

14. The array of claim 13, wherein
the first color filter is a green hue filter,
the second color filter is a blue hue filter,
the third color filter is a red hue filter, and
the fourth color filter is a white filter.

15. The array of claim 13, wherein
the first color filter is a red hue filter,
the second color filter is a blue hue filter,
the third color filter is a green hue filter, and
the fourth color filter is a white filter.

16. The array of claim 10, further comprising:
a first wall on the surface of the support plate, positioned between the first subpixel area and the third subpixel area, and positioned between the second subpixel area and the fourth subpixel area; and
a second wall on the surface of the support plate, positioned between the fifth subpixel area and the seventh subpixel area, and positioned between the sixth subpixel area and the eighth subpixel area.

17. The array of claim 10, wherein
at least one of the first color filter or the second color filter extend to an edge of the first electrowetting element,
at least one of the third color filter or the fourth color filter extend to an edge of the second electrowetting element,
at least one of the fifth color filter or the sixth color filter extend to an edge of the third electrowetting element, and
at least one of the seventh color filter or the eighth color filter extend to an edge of the fourth electrowetting element.

18. An electrowetting display apparatus, comprising:
an array of electrowetting pixels comprising:
  a support plate having a surface, each respective electrowetting pixel of the array of electrowetting pixels comprising:
    a first electrowetting element comprising:
      a first subpixel comprising:
        a first color filter substantially overlapping a first subpixel area of the surface; and
        a first electrode;
      a second subpixel comprising:
        a second color filter substantially overlapping a second subpixel area of the surface; and
        a second electrode;
      a first fluid configurable to adjoin at least one of the first subpixel area or the second subpixel area, in dependence on at least a first voltage applied using at least one of the first electrode or the second electrode; and
      a second fluid immiscible with the first fluid; and
    a second electrowetting element adjoining the first electrowetting element, the second electrowetting element comprising:
      a third subpixel comprising:
        a third color filter substantially overlapping a third subpixel area of the surface; and
        a third electrode;
      a fourth subpixel comprising:
        a fourth color filter substantially overlapping a fourth subpixel area of the surface; and
        a fourth electrode;
      a third fluid configurable to adjoin at least one of the third subpixel area or the fourth subpixel area, in dependence on at least a second voltage applied using at least one of the third electrode or the fourth electrode; and
      a fourth fluid immiscible with the third fluid;
at least one processor; and
at least one memory comprising computer program instructions, the at least one memory and the computer program instructions configured to, with the at least one processor, control the configuration of the first fluid, the second fluid, the third fluid, and the fourth fluid of each respective electrowetting pixel of the array of electrowetting pixels.

19. The electrowetting display apparatus of claim 18, wherein
the first color filter is a green hue filter,
the second color filter is a blue hue filter,
the third color filter is a red hue filter, and
the fourth color filter is a white filter.

20. The electrowetting display apparatus of claim 18, wherein
the first color filter is a red hue filter,
the second color filter is a blue hue filter,
the third color filter is a green hue filter, and
the fourth color filter is a white filter.

21. The electrowetting display apparatus of claim 18, wherein the first subpixel and the third subpixel are located on a column axis having a column axis angle offset substantially 45° from a predetermined display horizon.

22. The electrowetting display apparatus of claim 21, wherein the second subpixel and the fourth subpixel are located on a column axis having a column axis angle offset substantially 45° from a predetermined display horizon.

23. The electrowetting display apparatus of claim 22, wherein the first subpixel of a first electrowetting pixel of the array of electrowetting pixels and the fourth subpixel of a second electrowetting pixel of the array of electrowetting pixels are substantially aligned along the predetermined display horizon.

24. The electrowetting display apparatus of claim 23, wherein the first color filter of the first subpixel of the first electrowetting pixel is a green hue filter and the fourth color filter of the fourth subpixel of the second electrowetting pixel is a white filter.

* * * * *